United States Patent [19]
Wand et al.

[11] Patent Number: 4,800,974
[45] Date of Patent: Jan. 31, 1989

[54] ELECTRIC STEERING GEAR

[75] Inventors: Thomas J. Wand, Canton; Philip A. Gaubis, Walled Lake; Philip Q. Guest, Jr., Berkley, all of Mich.

[73] Assignee: TRW Inc., Cleveland, Ohio

[21] Appl. No.: 790,468

[22] Filed: Oct. 23, 1985

[51] Int. Cl.[4] .............................................. B62D 5/04
[52] U.S. Cl. .................................. 180/79.1; 180/142; 364/424.1
[58] Field of Search ............................ 180/79.1, 142; 74/388 PS; 364/426.1

[56] References Cited

U.S. PATENT DOCUMENTS

| | | | |
|---|---|---|---|
| 491,109 | 2/1893 | Holman . | |
| 1,625,125 | 11/1962 | Latour . | |
| 3,201,675 | 8/1970 | Curran et al. | 318/489 |
| 3,525,029 | 2/1975 | Joslyn et al. | 318/599 |
| 3,536,975 | 3/1981 | Hough | 318/396 |
| 3,868,554 | 11/1983 | Konrad | 318/434 |
| 4,259,626 | 10/1984 | Normura et al. | 318/599 |
| 4,415,054 | 6/1984 | Drutchas | 180/79.1 |
| 4,437,532 | 6/1984 | Nakamura et al. | 180/142 |
| 4,454,573 | 9/1984 | Petcsch et al. | 363/98 |
| 4,456,087 | 9/1985 | Lang et al. | 180/142 |
| 4,471,280 | 9/1984 | Stack | 318/586 |
| 4,476,529 | 10/1984 | Nakamura et al. | 180/142 |
| 4,513,835 | 4/1985 | Fukino et al. . | |
| 4,538,698 | 9/1985 | Hashimoto et al. | 180/79.2 |

FOREIGN PATENT DOCUMENTS 2135642 9/1984 United Kingdom .
2145678 4/1985 United Kingdom .
2145988 4/1988 United Kingdom .

OTHER PUBLICATIONS

Motorola TDA 1285A.

Primary Examiner—David M. Mitchell
Assistant Examiner—Donn McGiehan
Attorney, Agent, or Firm—Tarolli, Sundeim & Covell

[57] ABSTRACT

An electronic control system for a steering assembly having an electric motor coupled to the steering assembly for providing power assist. The electric power assist motor is drivably connected to a steering member for assisting movement thereof in response to applied input torque to the vehicle steering wheel. The electronic control unit monitors an output signal from a torsion sensor which measures the amount of applied input torque. The electronic control unit generates a pulse width modulated signal having a duty cycle proportional to the measured amount of applied input torque. Solid state switches provide connection between the vehicle battery and the motor, the connection time being controlled by the duty cycle of the pulse width modulated signal. A speed decoder determines which of a plurality of speed ranges the vehicle is moving. A plurality of look-up tables are provided, each table includes a value of power assist for a given amount of applied input torque. A look-up table is selected depending upon the decoded vehicle speed. Soft start circuitry is provided to control the maximum amount of assist that is permitted upon initial application of power to the electronic control unit. The amount to assist permitted increases from a minimum to a maximum within a predetermined amount of time. Temperature foldback circuitry is also provided to limit the amount of current through the electric power assist motor dependent upon sensed temperature of the solid state switches. The amount of current permitted through the motor is also limited to an absolute maximum. A connection cable is provided to reduce radiated electromagnetic emissions and voltage transients.

12 Claims, 7 Drawing Sheets

ELECTRIC STEERING GEAR

TECHNICAL FIELD

The present invention relates to a power assist steering system and particularly relates to an improved electric control for a power assist steering system.

BACKGROUND ART

There are many known power assist steering systems for automotive vehicles. Some provide assist by using hydraulic power and others by using electric power.

Electric power assist steering systems that utilize a rack and pinion gear set provide power assist by using an electric motor to either (i) apply rotary force to a steering input shaft connected to a pinion gear, or (ii) apply linear force to a steering member having the rack teeth thereon. The electric motor in such systems is typically controlled in response to (i) a driver's input torque applied to the vehicle steering wheel and/or (ii) vehicle speed. In U.S. Pat. No. 3,983,953, an electric motor is coupled to the input steering shaft and energized in response to the torque applied to the steering wheel by the vehicle operator. The electronic control system includes a torsion sensor and a vehicle speed sensor. A computer receives the output signals provided by both sensors. The computer controls the amount of the assistance provided by the motor dependent upon the applied torque and the vehicle speed.

U.S. Pat. No. 4,415,054, utilizes an electric assist motor having a rotatable armature encircling a steering member having rack teeth thereon. Rotation of the electric assist motor armature causes linear movement of the steering member through a ball nut drive arrangement. A torque sensing device is coupled to the steering column to sense driver-applied input torque to the steering wheel. The torque sensing device uses a magnet/Hall-effect sensor arrangement for sensing rotational deflection across a torsion bar. An electronic control unit monitors the signal from the torque sensing device and controls the electric assist motor in response thereto.

Previous electric assist steering systems have utilized discrete switches to apply and remove power to the electric assist motor. Such discrete switches typically permit arcing across the switch contacts prior to closure or during opening causing premature wear and subsequent failure of the contacts. To overcome problems associated with switch contacts, some motor control circuits have utilized solid state switching devices to connect operating current to the motor.

A solid state switching device is capable of passing a predetermined, maximum amount of current from a source potential to the power assist motor safely, i.e., without damaging the switching device itself. As the temperature of the solid state switching device rises, the maximum current that can be safely passed from the source potential to the power assist motor decreases. Circuits utilizing solid state switching devices have limited the drive current to the motor to protect the switching device by measuring the motor current. Limiting drive current only in response to measured motor current has not satisfactorily prevented failure of the solid state switching devices.

Electric power assist motors can draw a large amount of current during a steering maneuver. During such large current draws, electromagnetic radiation can occur causing electrical interference with other electrical controls. Electrical interference can cause spurious signals to be applied to the electric motor.

Still, other known power assist steering systems that utilize an electric assist motor have permitted power to be applied to the electric assist motor instantaneously with application of electric power to the vehicle. If a driver, with such a power assist steering system, had one hand on the steering wheel applying torque thereto while turning the ignition key with the other hand to start the vehicle, the driver would experience (i) the steering wheel rapidly turning in the direction of the applied torque the instant the ignition key is turned to the "on" position because the electric motor would apply maximum assist, (ii) no assist when the key is turned to the "start" position and (iii) maximum assist when the key is released to the "on" position. Such action of the steering wheel is quite startling to an individual accustomed to a hydraulic power assist steering system in which power assist is not available until the ignition key is turned to the start position cranking the engine and is very low until the engine "kicks-over" and reaches idle speed.

SUMMARY OF THE INVENTION

Certain aspects of the present invention are applicable (i) to any power assist steering system that is electronically controlled, and (ii) to any power assist steering system utilizing an electric assist motor.

The present invention generally provides control circuitry for an electric power assist steering system that "soft-starts" the electric assist motor, i.e., inhibits application of maximum power assist by the electric assist motor, when a driver is starting the vehicle and thereafter gradually increase the amount of assist available.

The present invention also provides control circuitry for an electric power assist steering system that (i) connects drive current to the electric assist motor using solid state switches, (ii) proportionally limits current to the motor based on the operating temperature of the solid state switches when a predetermined temperature value is exceeded, and (iii) continually clamps the motor current when an absolute limit is reached to protect the solid state switches.

The present invention also provides control circuitry for an electric power assist steering system that controls the amount of power assist provided by the electric assist motor responsive to (i) the input torque applied by the vehicle operator and (ii) the speed of the vehicle. The control circuitry provides different "torque-in" vs. "amount of applied assist" control curves for different vehicle speed ranges.

The present invention provides an electric power assist steering system having reduced electrical interference to prevent spurious signals from being applied to the electric assist motor from interference that might otherwise be generated.

In accordance with the present invention, a steering assembly is provided for turning the steerable wheels of a vehicle upon rotation of the vehicle steering wheel. The assembly includes means for mechanically coupling the vehicle steering wheel with the steerable wheels of the vehicle. The mechanical coupling means includes an input shaft connected to the steering wheel for rotation therewith, a pinion gear, a torsion member resiliently connecting the input shaft to the pinion gear, and a steering member having rack teeth thereon drivingly engaged by the pinion gear. The steering member is connected to the steerable wheels of the vehicle such that rotary motion of the pinion gear axially drives the steering member to turn the steerable wheels. The assembly further includes torsion sensing means for generating an electric signal having a value which varies proportionately with the amount of input torque applied to the steering wheel. Speed sensing means senses the speed of the vehicle and generates an electric signal indicative thereof. Electronic control means is connected to the torsion sensing means and to the speed sensing means. The electronic control means includes speed decoder means for generating a plurality of coded electric signals, each coded signal being indicative of the vehicle being within a particular range of vehicle speeds. Memory means stores a plurality of look-up tables, each vehicle speed range having an associated look-up table. Each look-up table has a control value corresponding to an input torque applied to the vehicle steering wheel. The assembly further includes means for selecting a look-up table responsive to the coded electric speed signal, means for selecting a control value from a selected look-up table responsive to the applied input torque, and means for generating a pulse Width modulated signal having a duty cycle controlled by the control value from the selected look-up table. An electric power assist motor is provided drivably connected to at least one of the input shaft, the pinion gear and/or the steering member for assisting movement thereof, the amount of assist being proportional to the duty cycle of the drive signal.

In accordance with a preferred embodiment of the present invention, a soft start circuit is provided including signal generating means for sequentially generating control values starting from a minimum assist value and increasing to a maximum assist value within a predetermined amount of time. The pulse width modulated signal has a duty cycle responsive to the smaller of (i) the control value from a selected look-up table, or (ii) the control value generated by the signal generating means. The memory means is a programmable read only memory, and the signal generating means for sequentially generating control values is a binary soft start counter initially loaded with a zero value. A comparator is provided for comparing the control value outputted from the programmable read only memory with the count outputted from the soft start counter. A value switch is provided and is controlled by the comparator for passing or transmitting the smaller value outputted from the programmable read only memory or the soft start counter. A down counter has its preload inputs connected to the value switch. The value passed by the value switch is loaded into the down counter periodically at a fixed frequency. A clock clocks the down counter, the output of the down counter being at an initial digital state when the value from the value switch is loaded therein and switching to another digital state when the down counter counts down to zero. The output of the down counter is the pulse width modulated signal with the duty cycle determined by the value outputted by the value switch and loaded into the down counter.

A cable is provided to connect the vehicle battery to solid state electrical switches that switchably connect the vehicle battery to the electric assist motor. The twisted cable includes four leads, two positive leads for connecting the positive terminal of the battery to the electrical switches and two negative leads for connecting the negative terminal of the battery to the electrical switches, the positive and negative leads being alternately arranged such that a plane through the two positive leads remains substantially perpendicular to a plane through the two negative leads, the four leads being twisted. The cable substantially reduces transmission of electromagnetic radiation and conducted emissions.

In accordance with another embodiment of the present invention, a steering assembly is provided for turning the steerable wheels of a vehicle upon rotation of the vehicle steering wheel. The assembly includes means for mechanically coupling the vehicle steering wheel with the steerable wheels. The mechanical coupling means includes an input shaft connected to the steering wheel for rotation therewith, a pinion gear, a torsion member resiliently connecting the input shaft to the pinion gear, and a steering member having rack teeth thereon drivingly engaged by the pinion gear. The steering member is connected to the steerable wheels of the vehicle such that rotary motion of the pinion gear axially drives the steering member to turn the steerable wheels. The assembly further includes torsion sensing means for generating an electric signal having a value which varies proportionately with the amount of input torque applied to the steering wheel. Electronic control means is connected to the torsion sensing means for generating a pulse width modulated signal having a duty cycle proportional to the applied input torque. An electric power assist motor is drivably connected to at least one of the input shaft, the pinion gear and/or the steering member for assisting movement thereof. The amount of assist provided is proportional to the duty cycle of the drive signal. The assembly further includes solid state electrical switches for switchably connecting an electrical drive potential to the electric power assist motor. The electrical switches are controlled by the pulse width modulated signal. The amount of current supplied to the electric power assist motor is proportional to the duty cycle of the pulse width modulated signal. The electronic control means further includes temperature sensing means for sensing case temperature of the electrical switches, and means for folding back the duty cycle of the pulse width modulated signal responsive to the temperature sensed by the temperature sensing means such that current supplied to the electric power assist motor decreases as the sensed case temperature increases.

DESCRIPTION OF THE DRAWINGS

Other features and advantages of the invention will be apparent to those skilled in the art by reference to the following detailed description taken in connection with the accompanying drawings wherein.

BEST MODE FOR CARRYING OUT THE INVENTION

Several aspects of the present invention are applicable to any power assist steering system having electronic controls to vary the amount of steering assist, regardless whether the assist is supplied using hydraulic or electric power. For purposes of explanation, the invention is described with reference to a steering system having a rack and pinion gear set, a ball nut drive assembly surrounding a worm portion of a steering member having rack teeth thereon, and an electric assist motor that drivably engages the nut portion of the ball nut drive assembly. The ball nut drive assembly converts rotary motion of the electric assist motor into linear movement of the steering member to aid the driver in a steering maneuver. The present invention is not limited to such arrangement.

Figure 1:
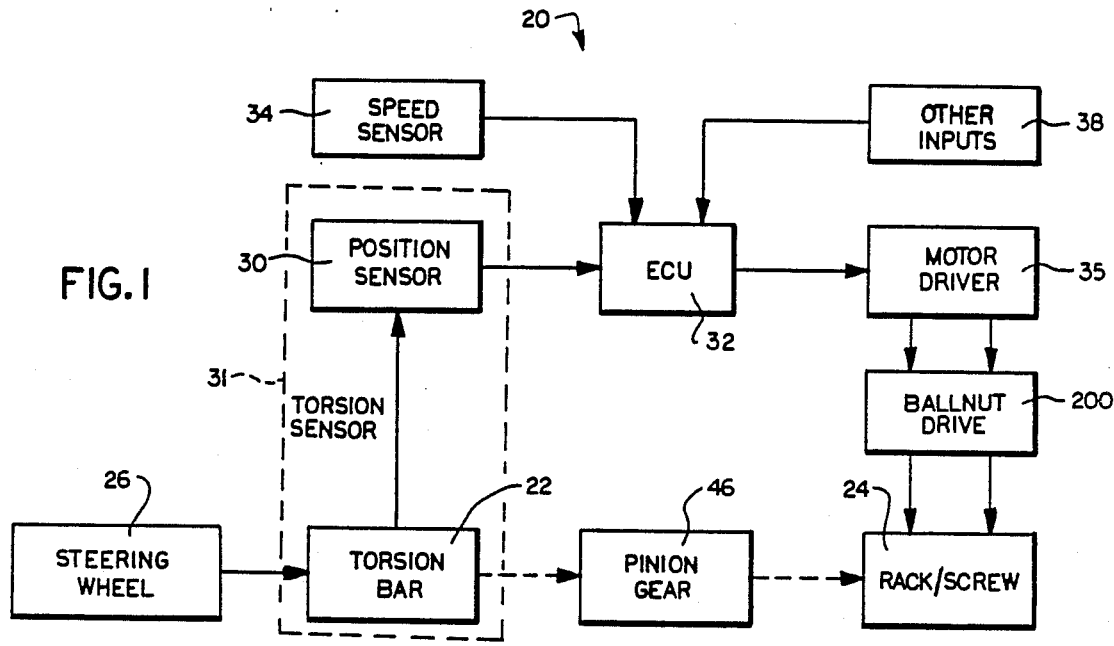
FIG. 1 is a schematic block diagram illustrating a power assist steering system in accordance with the present invention.

Referring to FIG. 1, a power assist steering system 20 includes a torsion bar 22 located in a steering column and operatively connected between the driver-operated steering wheel 26 and the steering member 24. The steering member 24 has rack teeth 55 on one portion and screw threads 56 on another portion in a known manner. The steering member 24 is in force-transmitting engagement with the steerable or dirigible wheels of a vehicle.

The vehicle steering wheel 26 is mechanically connected to the steering member 24 through the torsion bar 22. A driver input force applied to the vehicle steering wheel 26 and resistance to turning of the vehicle steerable or dirigible wheels creates a torque in the steering column and the torsion bar 22 to deflect by an amount proportional to the driver input force. An electronic position sensor 30 generates an electric signal which is indicative of the amount of twist of the torsion bar 22, and thus of the applied torque. The combination of the torsion bar 22 and the electronic position sensor 30 form a torsion sensor 31.

An electronic control unit 32 (ECU) receives the output signal of the electronic position sensor 30. The ECU 32 also monitors a speed signal supplied by a conventional speed signal generator 34, and other input signals generated by circuitry 38. In the embodiment being described, the circuitry 38 includes switches which are manually operable by the vehicle operator. ECU 32 generates motor control signals in response to its input signals. The motor control signals vary as a function of (i) the amount of applied torque, as sensed by the electronic position sensor 30, (ii) the speed of the vehicle., as measured from the speed signal generator 34, and (iii) the input control signals 38 manually set by the driver. The motor control signals are applied to a motor driver circuit 35, which controls the electric motor 36. The electric motor 36 drives the steering member 24 through the ball nut drive assembly 200 to aid the driver in completing the steering maneuver.

Figure 2:
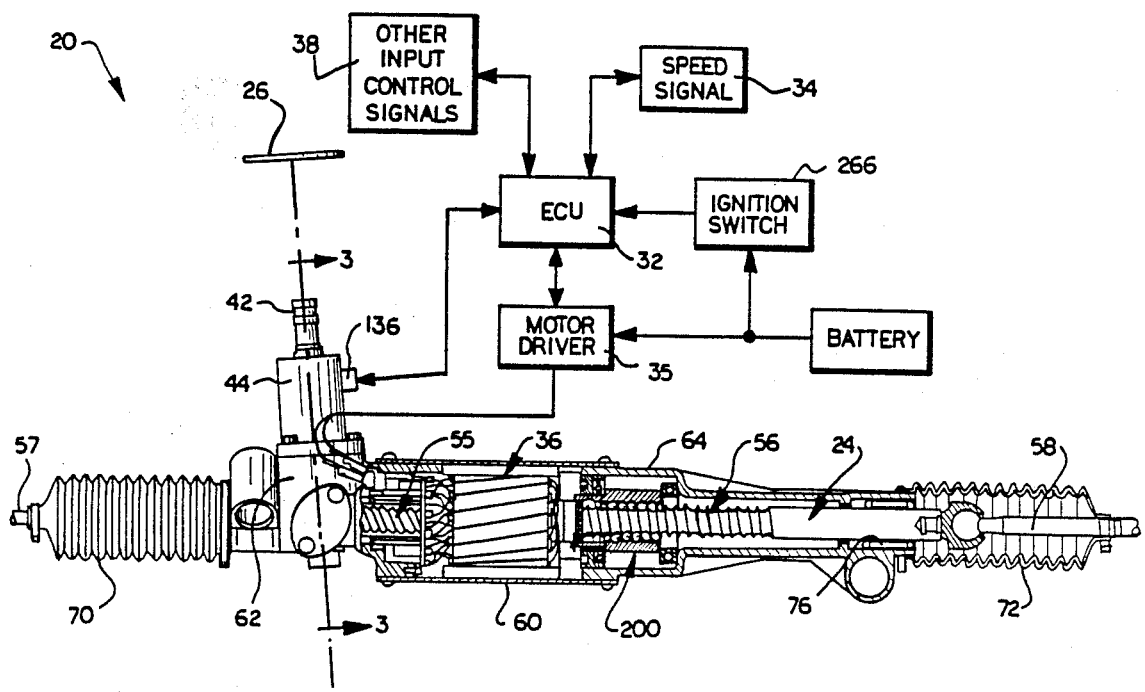
FIG. 2 is a top plan view partially in section of a portion of the power assist steering system.
Figure 3:
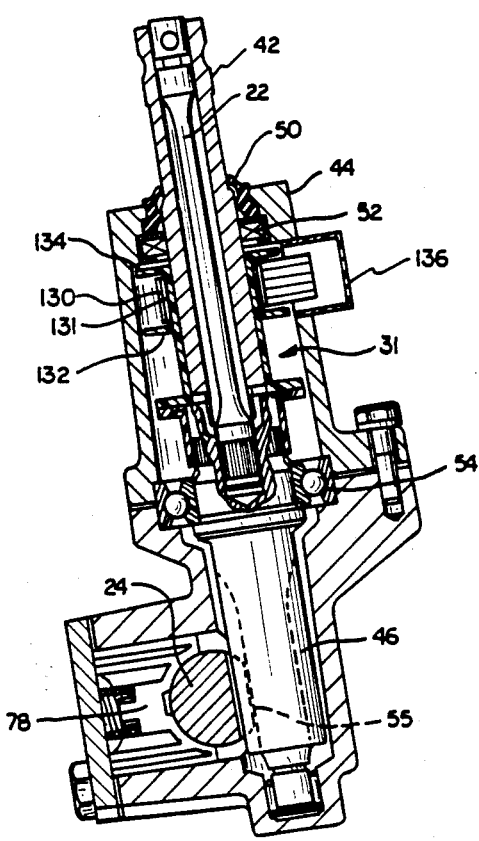
FIG. 3 is a sectional view taken along line 3—3 of FIG. 2.
Figure 4:
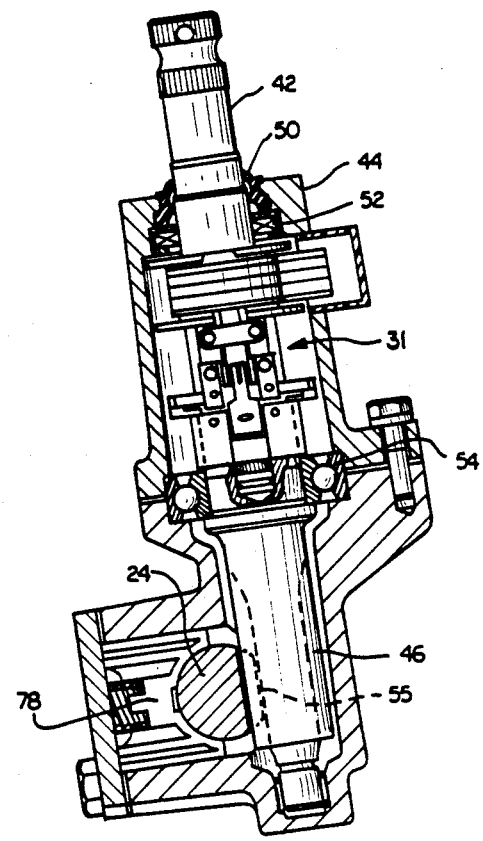
FIG. 4 is a view similar to the view shown in FIG. 3 illustrating additional structure.
Figure 5:
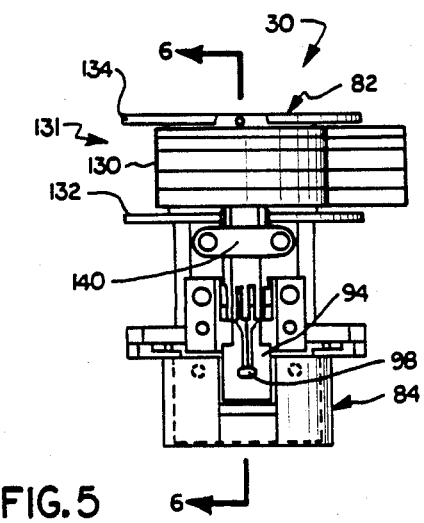
FIG. 5 is a fragmentary view of a portion of FIG. 4 on an enlarged
Figure 6:
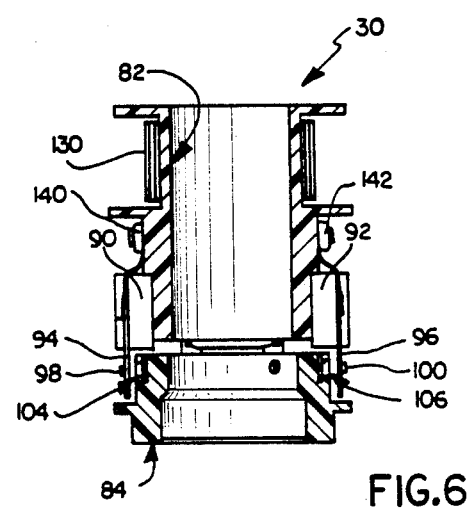
FIG. 6 : sectional view taken along line 6—6 of FIG. 5.

Referring to FIGS. 2–4 and FIG. 7, an electric power assist steering system 20 having a rack and pinion gear set 55, 46 is shown. A vehicle steering wheel 26 is operatively connected to an input shaft 42 in a known manner. As best seen in FIG. 3, the input shaft 42 extends into a pinion tower 44 and is mechanically coupled to a pinion gear 46 only through the torsion bar 22. The torsion, bar 22 is fixed at one end to the input shaft 42 and at the other end to the pinion gear 46. The torsion bar 22 deflects under torque applied to the ends thereof.

An elastomeric seal 50 located at the opening of the pinion tower 44 sealably engages the input shaft 42 and thereby seals the interior of the pinion tower 44 from the environment external of the pinion tower. Annular bearings 52, 54 respectively retain input shaft 42 and pinion gear 46 in coaxial relationship and permit relative rotation therebetween.

The steering member 24 includes a first portion having rack teeth 55 and a second portion 56 (FIGS. 2, 7) having screw or worm teeth. The pinion gear 46 includes helical teeth that meshingly engage the rack teeth 55 of the steering member 24. The steering member 24 is operatively connected to steerable wheels of the vehicle through tie rods 57, 58 in a known manner.

The friction between the road surface and the tires create a resistance to steering. The amount of steering resistance is dependent on the nature of the surface upon which the steerable wheels are engaging and the speed of the vehicle. To steer the vehicle, the driver must apply enough torque to the steering wheel to overcome the steering resistance. Input torque applied to the steering wheel 26 by the driver causes the input shaft 42 to rotate relative to the pinion gear 46, the amount of relative rotation depending on the amount of applied input torque and the torsion bar 22. The adjacent ends of the input shaft 42 and the pinion gear 46 have mechanical stops (not shown) that limit the amount of relative rotation therebetween to approximately ±4° from a neutral relative position which exists when no input torque is being applied to the steering wheel 26.

A motor housing 60 (FIG. 2) surrounds the steering member 24 and is bolted, at one end, to a pinion housing 62. The pinion tower 44 is bolted to the pinion housing 62. An outboard housing 64 is bolted to the other end of the motor housing 60. Tie rods 57, 58 are connected at opposite ends of the steering member 24 in a known manner. Dust boots 70, 72 are respectively connected between the tie rod 57 and the pinion housing 62 and between the tie rod 58 and outboard housing 64 to prevent environmental contaminants from entering the steering system. The steering member 24 is radially supported within the outboard housing 64 by bushing 76 and within the pinion housing 62 by a yoke 78 (FIG. 3) in combination with the pinion gear 46.

The torsion sensor 31 of the embodiment being described uses a linear Hall effect position sensor for measuring the extent of twist of the torsion bar. The principles of operation of a Hall effect device and the general method of using a Hall effect device to measure relative positions of two members is known in the art and will, therefore, not be described in detail. Briefly, a linear Hall effect sensor is fixed to one member and a magnet is fixed to the other member. The output voltage provided by the linear Hall effect sensor is dependent upon the position of the magnet relative to the sensor, which is, in turn, dependent on the relative positions of the two members.

Referring to FIGS. 3 through 6, a position sensor assembly 30 is operatively coupled to the input shaft 42 and the pinion gear 46 for measuring the amount of relative rotation therebetween and thus the amount of driver applied input torque. The assembly 30 includes a first cylinder portion 82 fixed to the input shaft 42 and a second cylinder portion 84 fixed to the pinion gear 46. Supports 90, 92 are attached to the cylinder portion 82 and are preferably diametrically opposed. Supports 90, 92 respectively carry substrates 94, 96 which in turn respectively carry linear Hall effect sensors 98, 100. The linear Hall effect sensor 98 has an associated magnet assembly 104 mounted in a recess in the cylinder portion 84. The linear Hall effect sensor 100 similarly has an associated magnet assembly 106 mounted in a recess in the cylinder portion 84.

Figure 8:
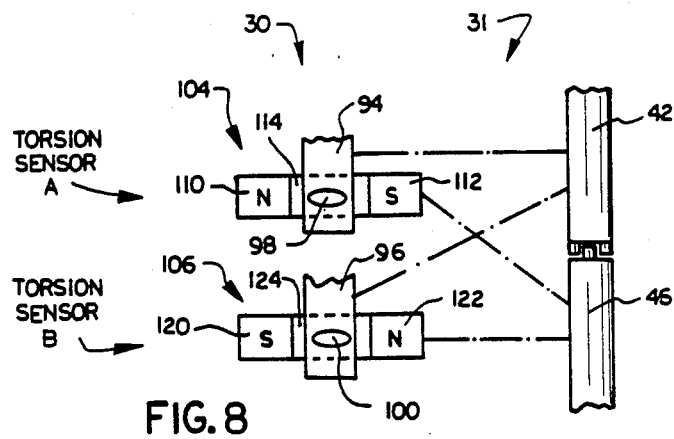
FIG. 8 is a schematic illustration showing the arrangment of the torsion sensor assembly of FIG. 6.

Referring to FIG. 8, magnet assembly 104 includes a first magnet 110 and a second magnet 112. The magnets 110, 112 are spaced apart and are connected by a pole piece 114. Magnets 110, 112 are arranged so that the north pole of magnet 110 and the south pole of magnet 112 face the linear Hall effect sensor 98. The linear Hall effect sensor 98 and the magnet assembly 104 are arranged with respect to the first cylinder portion 82 and the second cylinder portion 84 so that the linear Hall effect sensor 98 is axially aligned with the magnet assembly 104 and is halfway between magnets 110, 112 when he torsion bar 22 is untwisted, i.e. no input torque applied to the vehicle steering wheel 26. One method and apparatus to accomplish such alignment is fully disclosed in U.S. Application Ser. No. 596,655 to Drutchas, et al., assigned to the assignee of the present invention, and is hereby fully incorporated herein by reference.

The magnet assembly 106 associated with the linear Hall effect sensor 100 includes a first magnet 120 and a second magnet 122 connected by a pole piece 124. As described above with regard to the linear Hall effect sensor 98, the magnet assembly 106 and the linear Hall effect sensor 100 are arranged such that the linear Hall effect sensor 100 is axially aligned with the magnets 120, 122 and is positioned halfway therebetween when the torsion bar 22 is not twisted.

The combination of the linear Hall effect sensor 98, its associated magnet assembly 104 and the torsion bar 22 is hereinafter referred to as the torsion sensor A. The combination of the linear Hall effect sensor 100, its associated magnet assembly 106 and the torsion bar 22 is hereinafter referred to as torsion sensor B.

Figure 8A:
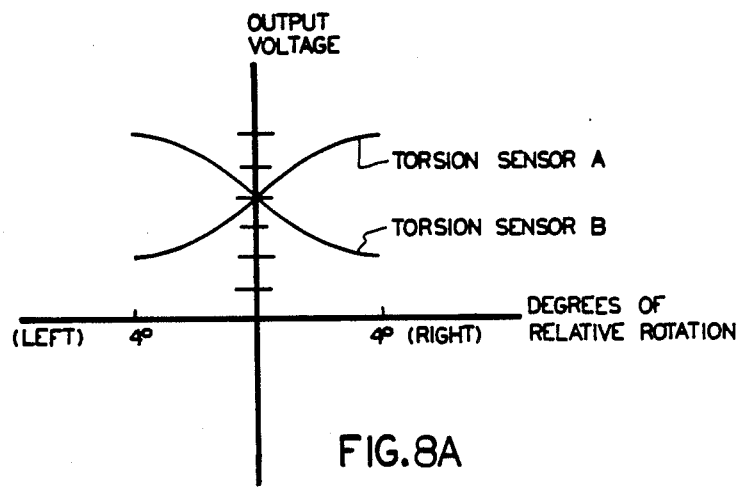
FIG. 8A is a graphical representation of the output signals from the torsion sensor assembly v. degree of relative rotation between the input shaft and the pinion gear;.

Referring to FIGS. 8 and 8A, if the input shaft 42 is rotated relative to the pinion gear 46 so as to move the linear Hall effect sensor 98 closer to the magnet 110, the linear Hall effect sensor 100 will move closer to the magnet 120. If the input shaft 42 is rotated relative to the pinion gear 46 so as to move the linear Hall effect sensor 98 closer to magnet 112, the linear Hall effect sensor 100 will move closer to the magnet 122. Thus, the output signal from the two torsion sensors A, B will be changing by equal but opposite amounts with bilateral symmetry when relative rotation occurs between the input shaft 42 and the pinion gear 46. These voltages are used to provide a signal which indicates steering direction and torque.

The ECU 32 provides a voltage source of 8VDC for the linear Hall effect sensors A and B. Each sensor is biased to output one half of the supply voltage (i.e., 4VDC) when the associated Hall sensors are half way between the magnets of their associated magnet assemblies (i.e., when the steering is in neutral). When the input shaft is rotated relative to the pinion shaft in one direction (for example, to make a right turn) the output voltage from torsion sensor A rises above 4VDC while the output voltage from torsion sensor B drops below 4VDC. The changes in the output signals of the torsion sensors A and B during relative rotation between the input shaft 42 and the pinion gear 46 are equal and opposite as is shown in the graph of FIG. 8A. The equal and opposite change in output voltage occurs because one linear Hall effect sensor is moving closer to an S-pole of a magnet while, at the same time, the other linear Hall effect sensor is moving closer to an N-pole of a magnet.

The torsion sensors are connected to the ECU 32 through a ribbon cable 130. Electrical ribbon cable 130 is wound around a ribbon spool 131 having extensions 132, 134 projecting radially outwardly of the cylindrical portion 82 of the torsion sensor assembly 30. A connector box 136 (FIG. 3) is received in an opening in the pinion tower 44. One end of the ribbon cable 130 is received in the connector box 136 and is adapted to make electrical connection with an external cable (not shown), also received in the connector box 136, to provide electrical connections between the ECU 32 and torsion sensors A and B.

The other end of the ribbon cable 130 is split. The 8VDC supply line, ground, and a return line are connected to torsion sensor A and the 8 VDC supply line, ground and another return line are connected to torsion sensor B. The ribbon cable 130 is loosely wound around the spool 131 of the cylinder portion 82 so as to permit the steering wheel to turn a predetermined number of revolutions in both directions from the centered, or straight-ahead position. Turning the vehicle steering wheel in one direction will coil the ribbon cable 130 and turning the vehicle steering wheel in the other direction will uncoil the ribbon cable 130. The ribbon cable 130 should be wound so as to permit the maximum number of turns of the vehicle steering wheel 26 in each direction without binding of the cable.

Each torsion sensor A, B has three leads connected to the cable 130 to provide two input supply lines and a sensor output line. Torsion sensors A, B respectively have stress relief straps 140, 142 securing their three associated leads from the ribbon cable 130.

Figure 7:
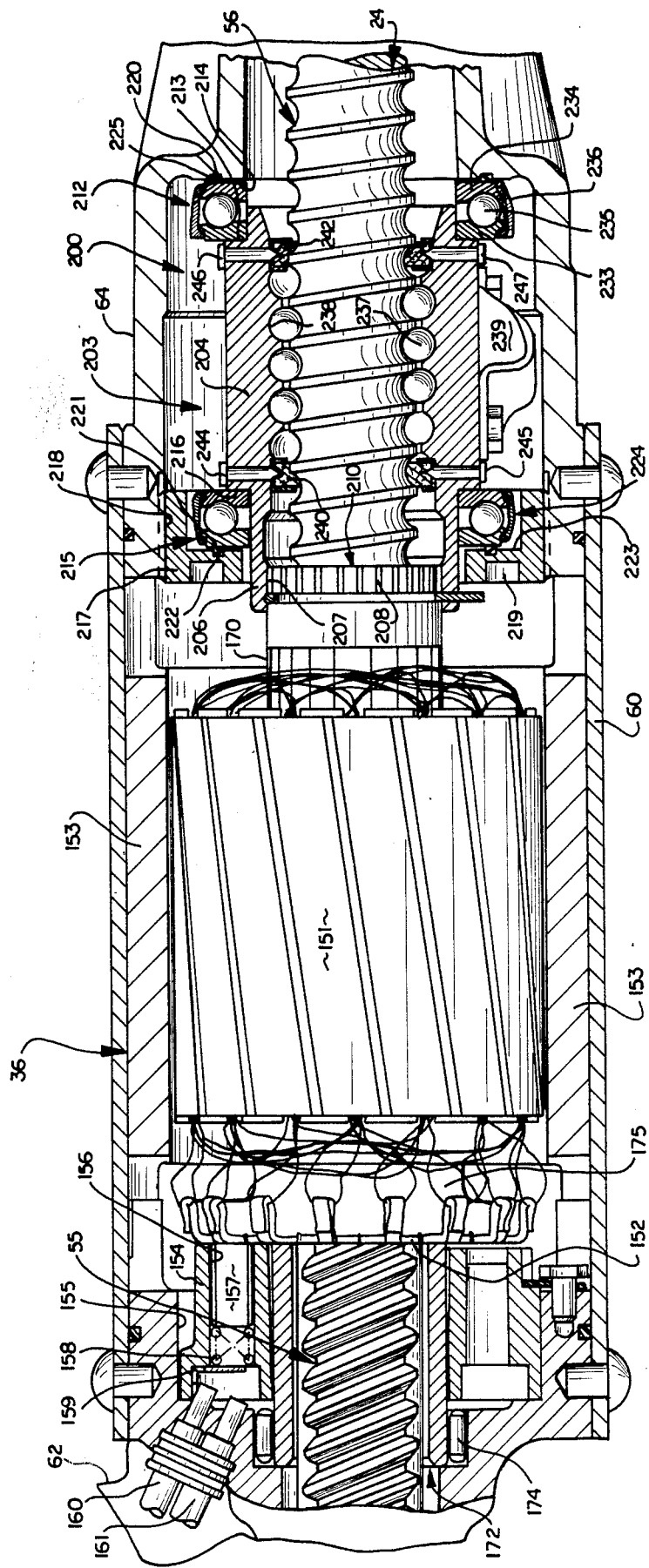
FIG. 7 a fragmentary sectional view of a portion of FIG. 2 on an enlarged scale.

Referring to FIGS. 2 and 7, an electric power assist motor 36 is located within the motor housing 60 and surrounds the steering member 24. The electric motor 36 is a four-pole permanent magnet DC motor including an armature 151 electrically connected to a commutator plate 152 and surrounded by four spaced apart permanent magnets 153. It is contemplated that magnets 153 can be either rare-earth magnets or fabricated, ceramic magnets. The magnets are secured to the interior of the motor housing 60. Adjacent magnets have alternate poles facing the armature 151.

A brush holder assembly 154 is threadably received in a bore 155 of the pinion housing 62 and has four, equally spaced brush receiving bores 156. Each brush receiving bore 156 slidably receives an electric brush 157. The brushes 157 are biased against the commutator plate 152 by means of springs 158. Each brush 157 has an associated metal brush rigging 159 associated therewith for connection to electrical connectors 160 or 161. The brushes that are 180° apart are connected together with one pair connected to connector 160 and the other pair of brushes are connected to connector 161. A connection tube 170 is connected to and extends axially outward of the armature 151. The connection tube 170 is rotatably supported at one end 172 by needle bearings 174. The commutator plate 152 is molded into a plastic, commutator-insulating support 175. The insulating support 175 is press fit onto the connection tube 170. When the electric power assist motor 36 is energized by the motor driver 35, the armature 151, the connection tube 170, and commutator plate 152 rotate about the steering member 24 as the magnets 153 remain stationary in the housing 60.

A ball nut drive assembly 200 drivably engages the worm or screw portion 56 of the steering member 24. The ball nut drive assembly 200 includes a generally cylindrical nut 203 having a main body portion 204 and a reduced diameter extension portion 206. An inner wall surface 207 of extension portion 206 has inwardly directed splines that are driveably engaged by radial projecting splines 208 located at an end 210 of the connection tube 170. As the armature 151 and connection tube 170 rotate upon energization of the motor 36, the nut 203 is driven in rotation therewith.

A thrust bearing 212 is positioned between one end 213 of main body portion 204 and an interior surface 214 of the outboard housing 64. Another thrust bearing 215 is positioned between the other end 216 of main body portion 204 and recess portion 224 of a spanner nut 217. The spanner nut 217 is threadably received into a threaded portion 218 of the interior surface of the outboard housing 64. Lug recesses 219 of the spanner nut 217 are used to screw the spanner nut in place. The spanner nut 217 side loads the ball nut drive assembly 200.

An O-ring 225 is held in an annular groove 220 in the interior wall 214 of the outboard housing 64 and contacts the thrust bearing 212. Another O-ring 221 is held in an annular groove 222 in the interior wall 223 of a recess portion 224 of the spanner nut 217. O-ring 221 contacts the thrust bearing 215. The O-rings 225, 221 attenuate noise generated during operation of the ball nut drive assembly 200. Each thrust bearing 212, 215 includes two annular races 233 and 234. A plurality of balls 235 are confined between the races. A closure cup 236 holds the two races 233, 234 together.

The ball nut assembly 200 includes a plurality of balls 237 which provide mechanical coupling between an interior threaded portion 238 of the main body portion 204 and the worm or screw portion 56 of the steering member 24. A recirculation tube 239 recirculates the balls 237 during rotation of the nut 203. As the motor 36 drives the connection tube 170 and thus the nut 203 into rotation, the balls 237 force the steering member 24 to move linearly. The ball nut drive assembly 200 thus acts as a gear box which converts rotary motion into linear motion.

Annular, felt wipers 240, 242 are respectively positioned at opposed ends of the main body portion 204 of the nut 203 to prevent dirt from entering the ball nut drive assembly 200. Pins 244, 245 and pins 246, 247 respectively hold the felt wipers 240, 242 in an axially fixed position relative to the main body portion 204 of the nut 203.

The steering member 24 is supported relative to the housings 60, 62, 64 only by the bushing 76 and the yoke-pinion 78, 46 combination in the pinion housing 62. The ball nut drive assembly 200 is axially fixed relative to the housings, but can "float" radially with radial movement of the steering member 24.

The connection tube 170 is supported at one end 210 by the ball nut drive assembly 200 and at its other end 172 by needle bearings 174. If the steering member 24 radially moves relative to the housings 60, 62 and 64, the connection tube 170 will move at its one end 210 with the ball nut 203 and pivot at its other end 172. During use, the steering-member 24 may bend slightly under load between its two supports 76 and the yoke-pinion combination in the pinion housing 62 causing radial displacement of the steering member 24 at the location of the nut 204. Under such a condition, the ball nut drive assembly 200 floats as the steering member 24 bends thereby preventing binding of the ball nut drive assembly 200.

Also, if the ball nut drive assembly 200 were radially fixed relative to the housings 60, 62, 64, it would be necessary to have tight tolerances to insure exact alignment between the bushing 76, the ball nut drive assembly 200 and the yoke-pinion combination. Binding of the ball nut drive assembly 200 could occur during operation, if sufficient alignment were not achieved. The float mounting arrangement of the ball nut drive assembly 200 using thrust bearings 212, 215 described above, relieves the tolerance problem by enabling the ball nut drive assembly 200 to follow any radial movement of the steering member 24. Binding of the ball nut drive assembly 200 is thus prevented.

Figure 9:
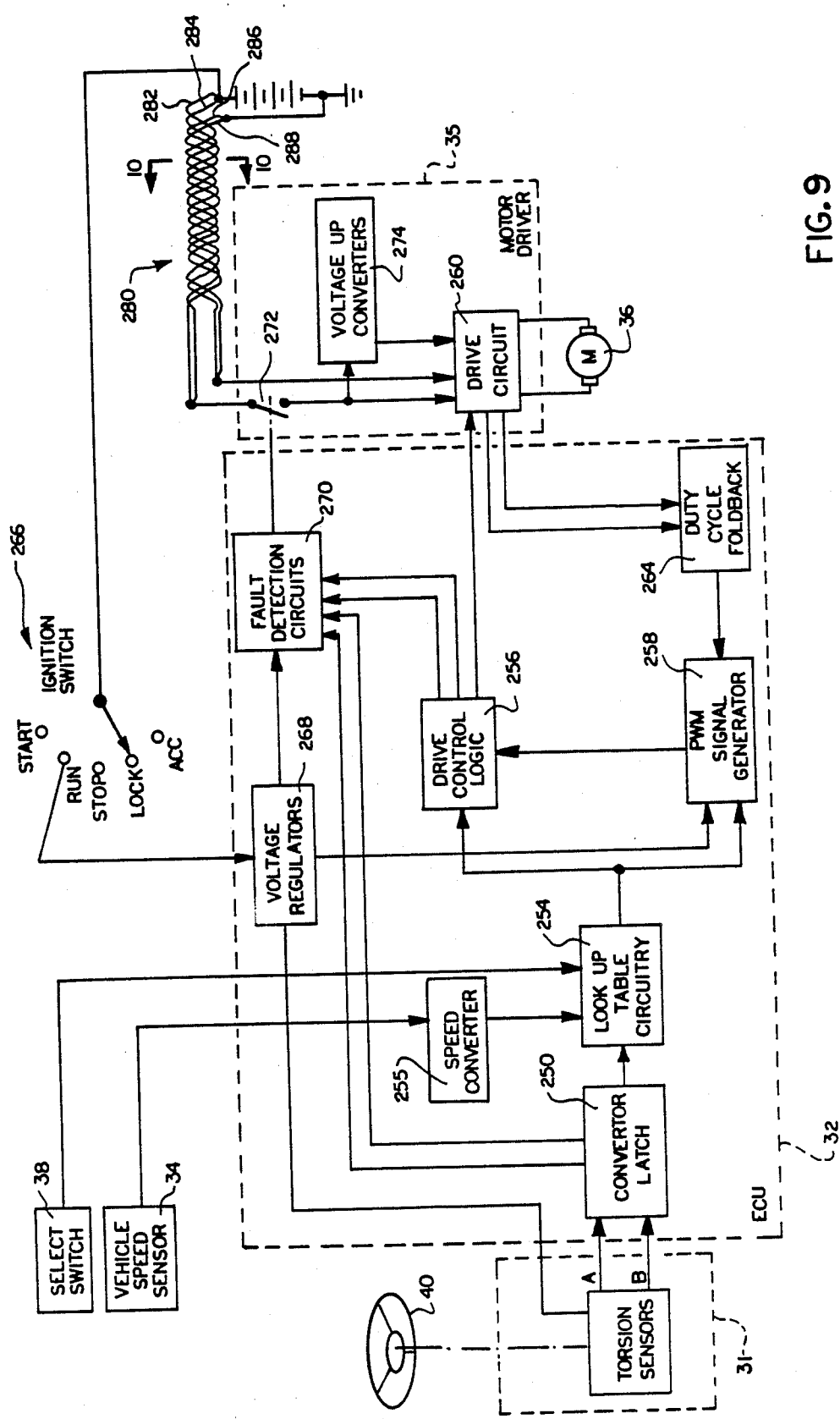
FIG. 9 is a schematic illustration of the electronics shown in FIG. 1.

FIG. 9 is a block diagram of the ECU 32 and associated electrical elements. As shown in FIG. 9, the electronic torsion sensor 31 provides two output signals, each from a corresponding one of the two linear Hall effect torsion sensors A and B. Each of the torsion sensor output signals is indicative of the amount of driver input force applied to the vehicle steering wheel 26. The electronic control unit 32 includes a converter latch 250 that converts the analog output signals from the torsion sensors A and B into digitally encoded signals. The digital signals are applied to an input of lookup table circuitry 254. Another input of the lookup table circuitry 254 is connected to the output of a select switch 38. It is desirable to have the degree of power assist modulated as an inverse function of the speed of the vehicle. The output of the vehicle speed sensor 34 is connected to a speed converter 255 which is in turn connected to the look-up table circuitry 254. The present system is preferably designed to permit maximum power assist when the vehicle speed is below a first value and to decrease to the minimum power assist when the vehicle speed reaches a second value.

The select switch 38 is manually set by the driver to select a desired steering "feel". In the embodiment currently being described, select switch 38 is a two-position switch. A first switch position selects a "standard" power assist "feel" and a second switch position selects a "sport feel," which would provide "stiffer steering feel" during a steering maneuver. Depending on the output signal of the vehicle speed sensor 34 which is converted by speed converter 255, the position of the select switch 38 and the signal from the converter latch 250, a value is selected from the lookup table. The value is outputted to a drive control logic 256 and to a pulse width modulation signal generator 258.

The pulse width signal generator 258 provides a pulse width modulated output signal to the drive control logic 256 which in turn outputs signals to a drive circuit 260 within the motor driver 35. The output signals supplied to the drive circuit 260 from the drive control logic 256 control the direction and amount of current provided to the electric assist motor 36. The magnitude and direction of the torque generated by the electric assist motor 36 are dependent upon the direction and amount of current applied to the motor by the drive circuit 260.

A voltage-up converter 274 is connected to the vehicle battery through relay 272. The supply voltages generated by the voltage-up converter 274 are applied to the drive circuit 260. The voltages from the voltage-up converter are needed to control certain solid state switches within drive circuit 260. The solid state switches in drive circuit 260 cyclically connect and disconnect the battery across the terminals of the motor 36. The amount of current drawn by the motor 36 is proportional to percentage of time that the battery is connected across the motor 36. That percentage of time is set by the duty cycle (percentage of "on" time) of the pulse duration modulated output signal supplied by the PWM signal generator 258.

A duty cycle fold-back circuit 264 monitors the magnitude of the current drawn by the motor 36 and the temperature of the driving circuit. The foldback circuit 264 limits the duty cycle of the pulse width modulated signal outputted from the pulse width modulated signal generator 258 when necessary to prevent excess current from being applied to the motor 36 or to prevent overheating of the drive circuit 260.

Power is applied to the electronic control unit 32 through the ignition switch 266, which connects the battery to a voltage regulator 268 when the ignition switch 266, is in the run position. The voltage regulator supplies voltages of +8 VDC and +5VDC.

Fault detection circuits 270 monitor various aspects of the operation of the electronic control unit 32. If the fault detection circuits 270 detect a fault in the operation of the electronic control unit 32, relay contacts 272 are opened. Contacts 272 are connected in the line between the vehicle battery and drive circuit 260. Consequently, power to motor 36 is cut off when contacts 272 open. Power assist is thus disabled when a fault is detected.

Since a substantial amount of electrical power can be consumed by the motor 36 during maximum assist conditions, and since the drive current is applied in a pulse width modulated manner, electromagnetic interference can be generated by the wires leading from the vehicle battery to the motor driver 35. If the motor driver is mounted on the pinion tower 44, the distance between the vehicle battery and the motor driver may be several feet.

Figure 10:
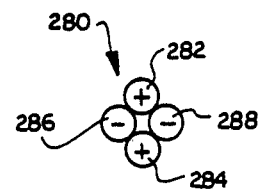
FIG. 10 is a cross section view as seen from the line 10—10 of Fi

Referring to FIGS. 9 and 10, a low inductance cable 280 is shown having two leads 282, 284 connected from the positive terminal of the vehicle battery to the motor driver 35 and two negative leads 286, 288 connected from the negative battery terminal to the motor driver 35. The leads are arranged so as to alternate between +, −, +, −, when viewed from the plane along the line 10—10 of FIG. 9 through the cable 280. A plane through the + +leads is substantially perpendicular to a plane through the − −leads. The cable 280 is twisted so as to make one complete revolution approximately every four inches.

The currents in the + and − conductive wires are of equal magnitude but opposite directions, consequently the magnetic fields produced by the currents will similarly be equal and opposite. The total magnetic flux surrounding each pair of adjacent conductive wires is thus approximately zero. Since no field is produced when current is flowing, there is no field collapse when the current is suddenly removed and therefore little electromagnetic interference. The cable 280 thus reduces radiated electromagnetic emissions and voltage transients. The connection cable is, however, flexible, and is significantly less expensive than coaxial cable.

Figure 11:
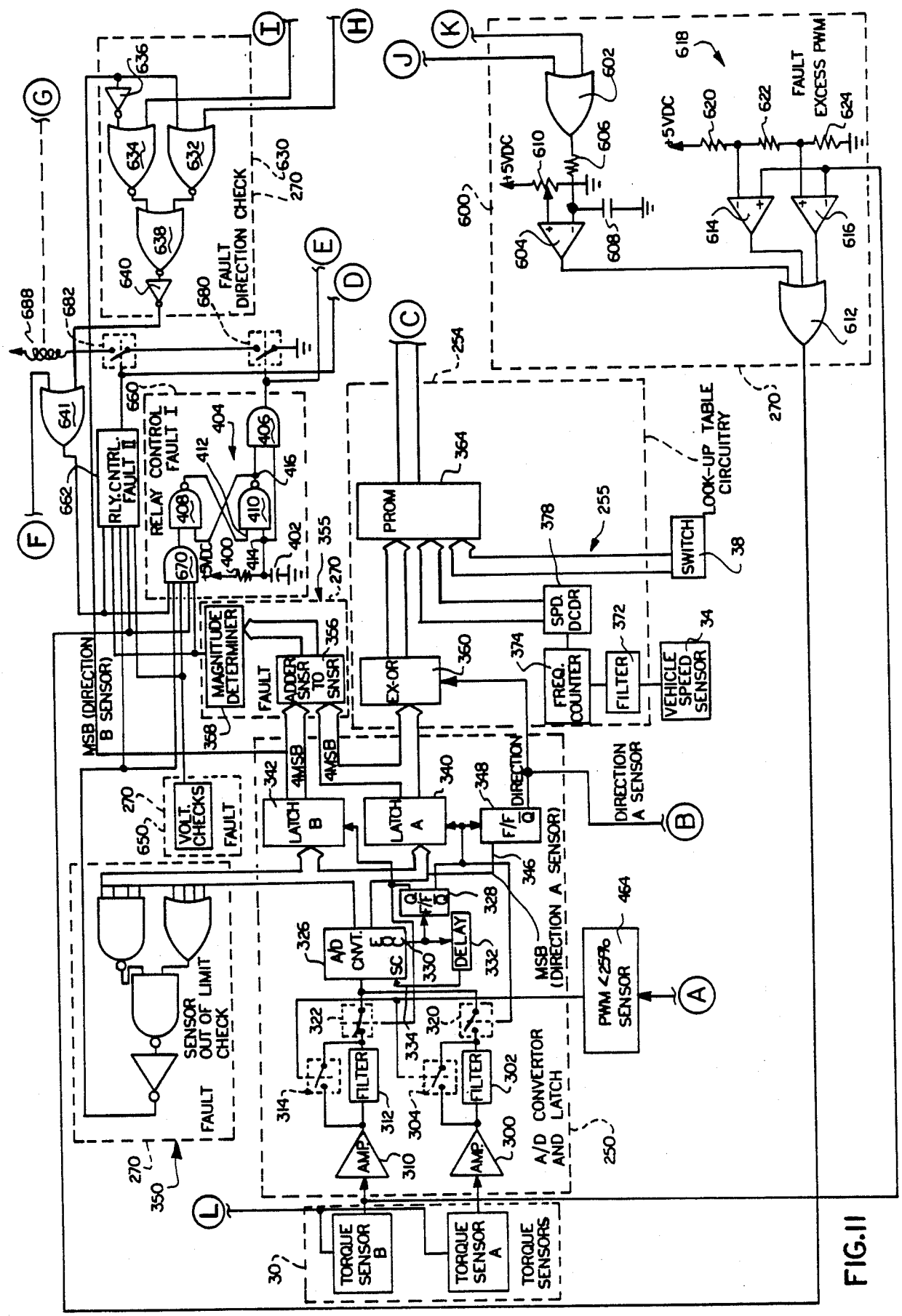
FIGS. 11 and 12 are detailed, functional block diagrams of t shown in FIG. 1.
Figure 12:
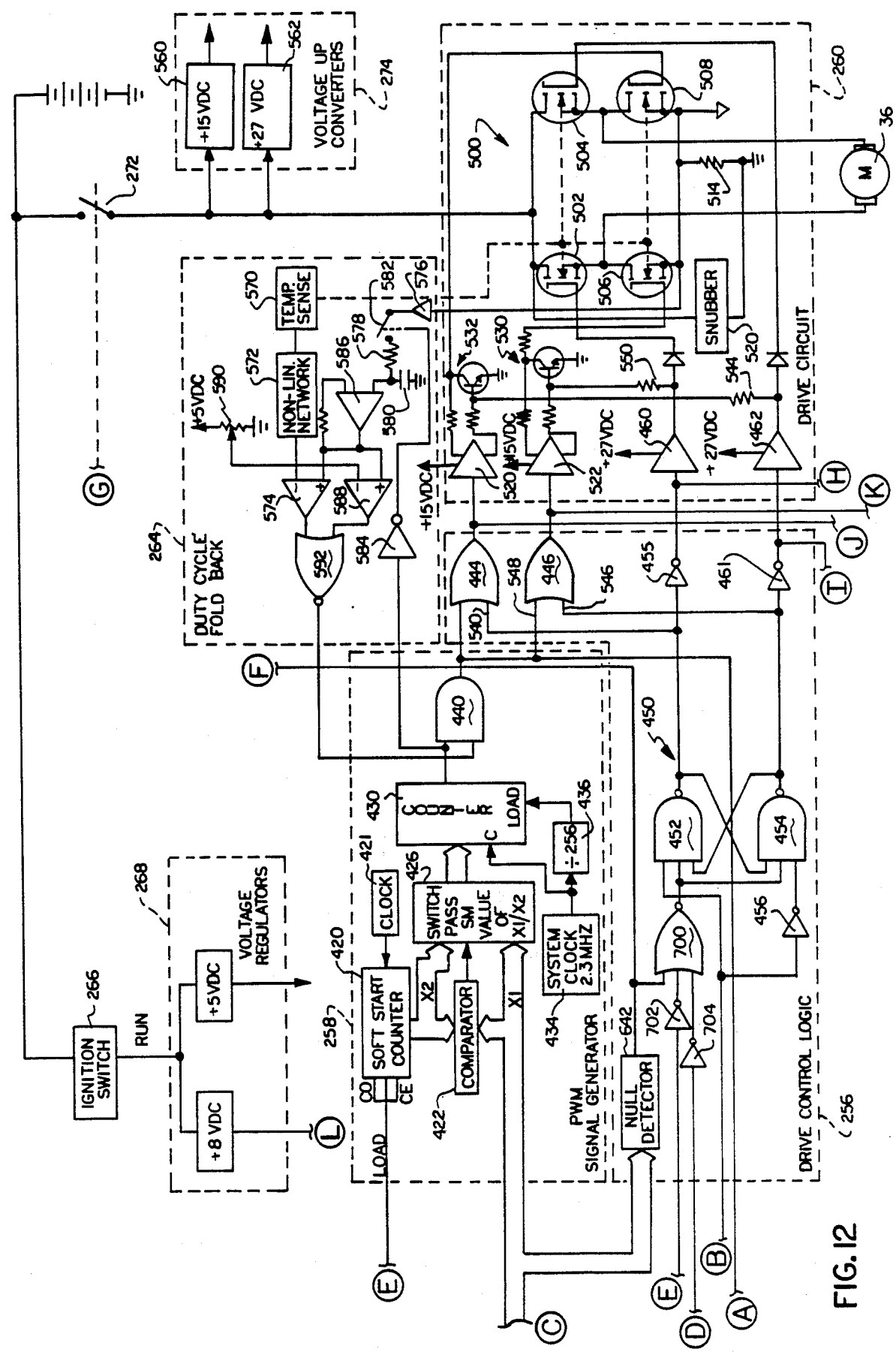

FIGS. 11 and 12 are a detailed functional block diagram of the system shown in general form in FIG. 9. FIGS. 11 and 12 together constitute a single functional block diagram where interconnections are depicted by the circled capital letters A–L. The connection line terminated with a circled capital letter A in FIG. 11 is connected to or a continuation of the line terminated with a circled capital letter A in FIG. 12. The other interconnections are coupled to one another in a similar manner.

Now, referring to FIGS. 11 and 12 as a single drawing, torsion sensors 31 include torsion sensor A and torsion sensor B. Referring to FIG. 8A, the output signals from the torsion sensors A, B each range from 2 volts to 6 volts D.C Each sensor provides a 4 volts D.C. output signal when no input torque is being applied to the steering wheel 26. The output signals from torsion sensors A, B vary equally and opposite from the 4 volt "no load" output as input torque is applied to accomplish a left or right turn steering maneuver. An amplifier 300 amplifies the output signal from torsion sensor A and outputs an amplified signal to a filter 302. Filter 302 filters out noise that may be present on the output of the amplified signal. A solid state switch 304 is connected in parallel across the filter 302 for bypassing the filter 302, its operation being described further below. Similarly, an amplifier 310 amplifies the output signal from torsion sensor B and outputs the amplified signal to a filter 312. Filter 312 filters out noise that may be present on the amplified signal from torsion sensor B. A solid state switch 314 is connected in parallel across the filter 312 to bypass the filter 312, its operation being described further below.

Solid state switches 320, 322 are respectively connected to the outputs of filters 302, 312. The outputs of solid state switches 320, 322 are coupled together and to an A-D converter 326. Converter 326 converts the analog output signals from torsion sensors A, B into a multiplexed stream of binary coded, digital output signals.

A flip-flop 328 has its Q output controlling the switch 322 and its $\overline{Q}$ output controlling the solid state switch 320. The end-of-conversion (EOC) output line 330 of the A-D converter 326 is connected to the input of flip-flop 328. A delay circuit 332 is connected between the end-of-conversion output 330 and the start-conversion (SC) input 334 of the A-D converter 326.

The flip-flop 328 closes one of the switches 320, 322 and opens the other of the switches 322, 320. For example, assume switch 320 is closed and switch 322 is open. The output of torsion sensor A is thus connected to the input of converter 326. After the converter completes the analog-to-digital conversion process, the EOC output 330 pulses and changes the state of the flip-flop 328. When the outputs of flip-flop 328 toggle, switch 322 closes and switch 320 opens. The output of sensor B is thus connected to the converter for conversion to digital. The next conversion begins when the EOC pulse reaches the SC input after passing through delay 332. The delay circuitry 332 is provided to permit sufficient time for the switches to open and close before the next conversion is begun.

Latches 340, 342 are connected to the output of the A-D converter 326 for receiving the digital signals from sensors A, B, respectively. The latches are controlled by the outputs of flip-flop 328. The flip-flop 328 enables the latch 340, 342 corresponding to the then-closed solid state switch 320, 322 so that the converted signal of torsion sensor A is latched in the latch 340 and the converted output signal from the torsion sensor B is latched in latch 342. The most significant bit 346 of the output of the A/D converter 32-6 is connected to a flip-flop 348. Flip-flop 348 is controlled by flip-flop 328 such that it latches the most significant bit (MSB) at the same time that the torsion sensor A is latched by a flip-flop 328. The most significant bit of the converted output signal of torsion sensor A is used to control the direction of operation of the electric assist motor 36.

As stated above, the torsion sensors A, B operate between a range of 2 volts D.C. to 6 volts D.C. A fault circuit 350, one of the fault circuits 270, monitors the four most significant bits from the converted output signals from torsion sensors A and B to determine if the converted signals are greater than 6 volts D.C. or less than 2 volts D.C., i.e., to determine if the torsion sensors A and B are operating outside of their normal operating limits. The output of the fault circuit 350 is connected to relay control circuits (660, 662) that control the relay 272. If the output of either of the torsion sensors A or B is outside of the 2-6 volt operating range, the power to the drive circuit 260 will be disconnected by the opening of relay 272. This process will be described below in detail. The fault circuitry 350 is directly connected to the output of the A-D converter 326, and, as such, requires blanking during the analogue-to-digital conversion process to insure that a false out-of-limit signal is not generated. Blanking circuitry are well known in the art and, for the purpose of clarity, are not shown or described in detail herein. It is assumed that those skilled in the art will readily recognize the need for blanking circuitry with appropriate digital devices. For example, during the conversion operation, the output of the A-D converter will output transient values. When a monitoring circuit is connected directly to the output of the converter, the output of the monitoring circuit must be blanked, i.e., the output disabled, until the converter completes its conversion indicated by the EOC signal. An alternative embodiment which eliminates the need for signal blanking is for the input to the fault circuit 350 to be connected to the outputs from the latches 340, 342. The outputs of the latches do not experience the transient values present at the output of converter 326 during the conversion process.

As discussed with reference to FIG. 8A, the output signals from each torsion sensor A and B is equal to 4 volts D.C. when there is no applied input torque. As torque is applied to execute a lefthand or righthand steering maneuver, the relative rotation between the input shaft 42 and the pinion gear 46 causes the output signals from torsion sensors A and B to vary equally and oppositely from the "no-torque" value. A fault circuit 355, one of the fault circuits 270, monitors the converted outputs of torsion sensors A and B to insure that they do, in fact, vary equally and oppositely. The four most significant bits from the outputs of latches 340, 342 are added in a digital adder 356. Since the output signals of torsion sensors A and B vary equally and oppositely from the 4 VDC signal outputted during a "no-torque" condition, the sum of the output signals should remain constant. A magnitude determiner 358 monitors the output of the adder 356 to insure that the sum of the four most significant bits outputted from the latches 340, 342 is approximately equal to the digital value representative of 8VDC. The magnitude determiner 358 outputs a signal indicative of whether or not the summation of the output signals from the torsion sensor A and B remains at the constant value. This fault check is sometimes referred to herein as the sensor-to-sensor check.

Flip-flop 328 triggers the "direction" flip-flop 348 and latch 340 at the same time. The output of the flip-flop 348 is thus the latched, most significant bit of the digitized value representing the output signal from torsion sensor A. The digitized value of the output of torsion sensor A is one of the values which is used to select a value from the look-up table circuitry 254.

The amplifier 300 is designed such that when the output signal from the torsion sensor A is at 4 volts D.C., the output signal from the amplifier 300 will be equal to a value that will cause the most significant bit of the A-D converter to change from a digital LOW ("0") to a digital HIGH ("1"). The most significant bit then indicates whether the torsion sensor signal is above or below 4 volts, thus indicating the direction of applied steering torque. For an A-D converter powered by five volt D.C., the amplifier 300 must output a signal to the A-D converter equal to 2.5 volts D.C. when the torsion sensor A is at 4 volts D.C. The gain of the amplifier 310 must be equal to the gain of the amplifier 300 so that the sensor-to-sensor check performed by the fault circuit 355 will operate properly.

When the output signal from torsion sensor A is at approximately 3.9884 volts D.C., the output of the A-D converter 326 from the most significant bit to the least significant bit is 011111111. For every 11.6 millivolt change in the output signal from torsion sensor A, the output from the A-D converter 326 commensurately increments or decrements a binary 1. When the output of torsion sensor A rises by approximately 11.6 millivolt to 4.0000 volts D.C., the A-D converter will switch to generate an output from the most significant bit to the least significant bit of 100000000. As the output signal from torsion sensor A continues to increase above 4 volts, the output signal from the A-D converter will increment a binary 1 for every 11.6 millivolts increase in the output of torsion sensor A.

The most significant bit from the A-D converter 326 is latched in the flip-flop 348 and is used for direction sensing only. As indicated above, the MSB will have a binary value of "1" for turns in one direction, and a binary value of "0" for turns in the other direction. The eight next-most-significant bits switch from 11111111 to 00000000 when the output voltage from the torsion sensor A increases from 3.9884 volts D.C. to 4.0000 volts D.C. The 8 next-most-significant bits, viewed by themselves, have ambiguous meaning. For example, a digital code of 01110000 latched in latch A could be indicative of an output voltage equal to 1.2992 volts D.C. or 5.2992 volts D.C. from a torsion sensor A. The most significant bit (as latched in latch 348) is used to resolve this dilemma. A set of exclusive OR gates 360, controlled by the output of flip-flop 348 (the most significant bit of the converted torsion sensor A signal), inverts each bit of the output of latch 340 when the output of flip-flop 348 is in one state and transmits the bits without change when the output of flip-flop 348 is in the other state. In essence, the flip-flop 348 in combination with the exclusive OR gates 360 normalizes the output of the A-D converter about a value at which the torsion sensor outputs a voltage indicative of no driver applied input torque, i.e., normalizes the output A-D output about a 4VDC output signal from the torsion sensor A.

Figure 13:
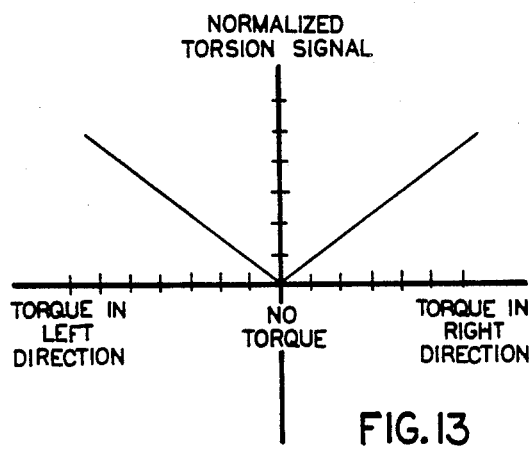
FIG. 13 is a graphical representation of a normalized torsion signal v. amount of driver applied input torque.

FIG. 13 is a graph depicting the normalized output signal from the exclusive OR gates 360 as a function of driver-applied steering. The normalized output from the exclusive OR gates 360 will equal 0 when the output of torsion sensor A is at 4VDC. The output of the exclusive OR gates 60 will increase when the torsion sensor A signal is either above or below the 4VDC level. The exclusive OR gates 360 thus output a digital value equal to the absolute magnitude of the applied input torque. The direction of the steering maneuver is indicated by the most significant bit latched into flip-flop 348.

The output from the exclusive OR gate 360 is used to address a programmable read only memory (PROM) 364. The PROM 364 includes a plurality of look-up tables containing values of the amount of power assist to be provided by the electric assist motor 36 as a function of the applied input torque (as measured by torsion sensor A). Other address inputs are derived from manual switches and from a vehicle speed sensor.

The vehicle speed sensor 34 generates a signal having a frequency proportional to the speed of the vehicle. Such speed sensors are well known in the art and will not be described herein. The speed signal converter 255 is connected to the output of the speed sensor 34. The speed signal converter includes a filter 372 connected to the vehicle speed sensor 34 which filters noise from the speed sensor signal. The speed signal converter further includes a frequency counter 374 connected to the output of filter 372 which counts the number of cycles of the speed sensor signal over a predetermined amount of time. The frequency counter outputs a signal indicative of that count, and thus indicative of vehicle speed. The speed converter further includes a speed decoder 378 which monitors the count at the output of the frequency counter 374 and determines which of a plurality of speed ranges the current vehicle speed falls within. The speed decoder may, for example, discriminate vehicle speed into speed ranges of: 0-14 mph, 15-29 mph, 30-44 mph or greater than 45 mph. The speed decoder 378 outputs a digitally coded signal indicating which vehicle speed range the current vehicle speed falls within. The output of the speed decoder 378 is connected to address input lines of the PROM 364. Each speed decoder output value selects a different torque-in/torque-out look-up table within PROM 364. A different torque-in versus torque-out control characteristics can thus be achieved for each of the different speed ranges.

The select switch 38 is connected to PROM 364 and is also used for determining which of two sets of look-up tables within the PROM 364 will be addressed by the torque and speed signals. The select switch is preferably a two-position switch to provide, in a first position, a "standard power assist feel" and, in a second position, a "sport feel." The output signal from the PROM 364 is thus dependent upon (i) the amount of driver applied input torque sensed by torsion sensor A, (ii) the vehicle speed signal 34, and (iii) the position of the select switch 38. The output of PROM 364 controls the amount of current applied to the electric assist motor 36, which, in turn, controls the amount of steering assist.

Power is supplied to the electronic control unit 32 when the ignition switch 266 is in the run position. The driver could feel a jerking in the steering wheel if full power assist were provided the instant the ignition switch was turned to the RUN position. Such would occur, for example, if the driver had one hand on the steering wheel 26 and was applying torque during the starting process. As the ignition key was first turned to the RUN position, sudden assist would be immediately provided. The steering wheel would thus rotate rapidly. Then, as the key was further turned to the START position, no power assist is available. The vehicle operator would feel the loss of assist as a sudden stop of the initial rapid turning of the vehicle steering wheel. Although the operator feels a sudden stop of the vehicle steering wheel, what occurs is a switch from full power assist to no power assist or manual steering. After the vehicle started and the key was returned to the RUN!-position, full assist would again be available, and the vehicle steering wheel would again rapidly turn in response to the applied torque.

To prevent the jerking feel of the steering wheel during start-up of the vehicle, a soft-start circuit is provided as part of the PWM signal generator circuit 258. The start-up circuit is activated after a power-up "clear" has timed-out. The power-up "clear" is effected by a circuit within the relay control logic (660, 622). The circuit includes a resistor 400 connected in series with a capacitor 402 between the 5 volt D.C. supply and ground. The junction between resistor 400 and capacitor 402 is connected to a flip-flop 404 and to a NAND gate 406.

The flip-flop 404 includes NAND gates 408, 410 cross-coupled in a known manner to create an RS flip-flop function. When power up first occurs, the junction 414 of resistor 400 and capacitor 402 will be LOW. The output 416 of NAND gate 410 will thus be forced HIGH. The output of AND gate 406 will then be LOW, and will switch from a digital LOW to a digital HIGH only after the capacitor 402 charges to the switching threshold voltage of the AND gate 406.

The output of AND gate 406 is connected to a LOAD input of a soft start counter 420 (FIG. 12). A clock 421 provides clock pulses to the soft start counter 420. The soft start counter 420 begins to count when the AND gate 406 switches from a digital LOW to a digital HIGH. A comparator 422 compares the count X2 of the soft start counter 420 to the output X1 of PROM 364. The purpose of the comparison is to determine which of the two values X1 or X2 is smaller. The comparator 422 is connected to a solid state multiplexing switch 426. The solid state switch 426 outputs or passes the smaller of the values X2 or X1, as determined by the comparator 422. The output of switch 426 is the pulse width modulation signal.

The soft start counter includes "preset" inputs that permit an initial count to be preset into the counter. A count equivalent to zero is hard wired on the preset input. As long as the output of AND gate 406 and thus the LOAD input of counter 420 is held LOW (e.g., during a power-on "clear"), a count of zero is loaded into the counter. The counter therefore outputs a binary zero. Once the output of AND gate 406 and thus the LOAD line of counter 420 goes HIGH (e.g., after a power-on "clear"), the counter begins counting upward from zero. The counter continues counting upward until the carry-out (CO) disables the counter enable (CE).

Assume that torque is being applied to the vehicle steering wheel as the vehicle is being started. The PROM 364 will output a digital control value X1 that would normally control the electric assist motor to provide an amount of assist proportional to the amount of applied input torque. Initially, however, the output X2 of the soft start counter 420 is smaller than the output X1 of PROM 364. Thus, the value X2 is initially applied to the pulse modulation circuitry in place of the PROM output X1. The comparator 422 will control the switch 426 to continue to pass the count X2 from the soft start counter 420 until the count X2 from the soft start counter equals or exceeds the value of the output X1 from the PROM 364. The extent of power assist continues to build up as the output of switch 426 increases.

The rate of buildup of power assist is dependent upon the clock frequency of clock 421. The clock frequency will be selected such that maximum assist is available only after a predetermined amount of time has elapsed after the initial application of power. It has been found that an initial time delay of 0.2 seconds (power on "clear") and a clock pulse rate for clock 421 selected such that the soft start counter counts from zero to maximum in 0.8 seconds has proven satisfactory in preventing jerking of the steering wheel during vehicle start-up. Once the soft start counter 420 has reached its maximum count, the carry-out line (CO) disables further counting, whereby the count output X2 remains at the maximum count. Thereafter, the output X1 will always be less than or equal to X2 and therefore the signal X1 will be passed by the switch 426.

The output of the solid state switch 426 is connected to a counter 430. Counter 430 is a down counter used to generate the pulse width modulated signal. Counter 430 counts down to zero from an initial value loaded therein from the output of switch 426. Counter 430 is clocked by a 2.3 mHz clock signal generated by a system clock 434. A divide-down circuit 436 divides the system clock frequency by 256 to generate a 9 kHz signal. The 9 kHz signal is applied to the LOAD input of counter 430.

The carry-out output of counter 430 switches to a digital HIGH when the passed value of X1 or X2 from the switch 426 is loaded into the counter 430 and stays HIGH until the count within counter 430 reaches zero, which in turn depends upon the magnitude of the signal X1 or X2 loaded into counter 430 from switch 426. Therefore, the output signal from the counter 430 is a pulse width modulated signal having a frequency of 9 KHz and a duty cycle controlled by the smaller of the value X1 from the PROM 364 or the value X2 from the soft start counter 420. After the one second soft start provided by the soft start counter 420, X2 is at a maximum value and the duty cycle of the output pulse from the counter 430 is controlled exclusively by the output X1 of the PROM 364 which is always less than or equal to X2. The output of counter 430 is directed to OR gates 444, 446 through an AND gate 440. The outputs of OR gates 444 and 446 are applied to the inputs of the motor drive circuit 260.

OR gates 444 and 446 are part of the drive control logic 256. The OR gates cooperate with a flip-flop 450 to generate drive signals for drive circuit 260. Flip-flop 450 is formed of two cross-coupled NAND gates 452 and 454, and is primarily controlled by the output of flip-flop 348. Flip-flop 348, it will be recalled, stores the most significant bit from the torsion sensor A, that bit being indicative of the direction of the turning maneuver initiated by the input torque from the operator. The output of flip-flop 348 is applied directly to one input of AND gate 452, and indirectly to an input of AND gate 454 through an inverter 456. The output of flip-flop 348 controls the states of the outputs of NAND gates 452, 454, assuming no circuit faults are detected as discussed below.

The output of NAND gate 452 is connected to an inverter 455 which is in turn connected to a driver 460. The output of NAND gate 452 is also connected to the other input of OR gate 444. The output of NAND gate 454, on the other hand, is connected to an inverter 461, in turn connected to a driver 462. The output of NAND gate 454 is also connected to the other input of OR gate 446. The connection between the RS flip-flop network 450 and the OR gates 444, 446 controls the direction of rotation of the electric assist motor 36 by permitting a pulse width modulated signal to be outputted from only one of the OR gates 444, 446, while also permitting the activation of only one of the drivers 460, 462 at a time.

The output from AND gate 440 is connected (line "A") to a PWM sensor 464 (FIG. 11) that monitors the duty cycle of the PWM signal. The sensor 464 generates one signal when the duty cycle of the PWM signal is less than 25% and a second signal when the duty cycle of the PWM signal is greater than or equal to 25%. The output signal from the PWM sensor 464 is used to control both filter bypass switches 304 and 314. When the duty cycle of the PWM signal is less than 25%, the signal generated by the sensor 464 closes the solid state bypass switches 304 and 314 to respectively bypass filter circuits 302, 312. When the duty cycle of the PWM signal is greater than or equal to 25%, the solid state switches 304, 314 are opened, effectively placing filters 302, 312 in the circuit. When the PWM duty cycle is equal to or greater than 25%, the gain of the steering system is high, which is conducive to stability problems. Without the use of filters, such stability problems may manifest itself as "chatter" in the vehicle steering wheel. The use of filters stabilizes the steering system against instabilities in the overall system response. However, when the duty cycle is less than 25%, continued use of the filters 302, 312 would result in an objectionable "on-center feel". To improve the "on-center feel", the filters are operatively removed from the circuit by shorting of the filters 302, 312 by switches 304, 314, respectively.

The signals supplied by OR gates 444, 446 and inverters 455, 461 are each used to control a corresponding leg of an H-bridge 500 included in drive circuit 260. The electric assist motor 36 is operatively connected across the H-bridge 500, which includes FETs 502, 504, 506 and 508. The junction between the two upper FETs 502, 504 is connected to one side of the power relay contacts 272. The other end of the power relay contacts 272 is connected to the positive terminal of the vehicle battery. The junction between the upper-left and lower-left FETs 502, 506 is connected to one side of the electric assist motor 36 and the junction between the upper-right and lower-right FETs 504, 508 is connected to the other side of the electric assist motor 36. The junction between the two lower FETs 506, 508 is connected to a shunt resistor 514. The other end of the shunt resistor 514 is connected to the negative terminal of the battery. A snubber circuit 520 is connected across the H-bridge, between the junction of FETs 502, 504 and the negative battery terminal. The purpose of the snubber is to filter out switching transients that may occur across the solid state H-bridge 500 during activation of the electric assist motor 36.

The gates of the two lower FETs 506 and 508 in the H-bridge are driven from the outputs of OR gates 444 and 446 through respective interface amplifiers. More specifically, an amplifier 520 is connected to the output of OR gate 444. An amplifier 522 is similarly connected to the output of OR gate 446. The output of amplifier 522 is connected to a transistor network 530, which is, in turn, connected to the gate of FET 506. The output of the amplifier 520 is similarly connected to a transistor network 532, which is, in turn, connected to the gate of FET 508. The gates of the two upper FETS 502 and 504 are driven by the outputs of driver amplifiers 460 and 462.

The voltage-up converters 560, 562 convert the 12 volt battery voltage to 15 volts DC and 27 volts DC, respectively. Amplifiers 520, 522 are powered by the voltage-up converter 560 and amplifiers 460, 462 are powered by the voltage-up converter 562. The purpose of the voltage-up converters is the insure that to FETs 502, 504, 506 and 508 can be properly turned on. Typically, the voltage on the gate of an FET must be 15 volts above the voltage on the source in order for the FET to be fully turned on.

To energize the electric motor 36 in a first direction, the direction RS flip-flop 450 is set by the output of the flip-flop 348 such that the output of NAND gate 452 is HIGH and the output of the NAND gate 454 is LOW. The output of amplifier 462 is then approximately 27 volts DC, which turns the upper-right FET 504 "on". The output of amplifier 460 will be at essentially ground potential, maintaining the upper-left FET 502 "off". With the input 540 of OR gate 444 high, the output of OR gate 444 will be high independent of the output of AND gate 440. The output of amplifier 520 will then be at approximately 15VDC, causing the transistor in the network 532 to be continuously "on" and the lower-right FET 508 to be continuously "off". The output of amplifier 462 (now at 27VDC) is connected to the base of the transistor in the network 532 through a resistor 544 to insure that the lower-right FET 508 is, indeed, "off" when FET 506 is "on". This redundancy enhances the safe operation of the motor drive system.

The conductance state of the lower-left FET 506 is pulse-width modulated. The input 546 of OR gate 446 is held LOW while the input 548 of OR gate 446 is the pulse width modulated signal from the output of AND gate 440. The amplifier 522 turns the FET 506 on and off responsive to the pulse width modulated signal from the AND gate 540. The result is that the upper-right FET 504 is continuously "on" for the duration of the steering maneuver (thus connecting one side of the motor 36 to the positive battery terminal), while the lower-left FET 506 is switched "on" and "off" (thus providing a pulse width modulated connection between the other side of motor 36 and the negative battery terminal through the shunt resistor 514).

To activate the motor in the opposite direction, the RS flip-flop network 450 is switched by the output of flip-flop 348 with the output of NAND gate 452 being a digital LOW and the output of the NAND gate 454 being a digital HIGH. In this condition, the upper-left FET 502 is maintained in a continuous on condition, while the lower-right FET 508 is pulsed in response to the pulse width modulated signal from the output of the NAND gate 440. The other FETs 504, 506 are both maintained in an off condition. The direction redundancy in this example occurs because the output of the amplifier 460 is connected to the base of the transistor in the network 530 through resistor 550 The coupling provided by resistor 550 insures that FET 506 is "off" as long as FET 502 is "on".

It is desirable to control the current being outputted to the electric assist motor as a function of the absolute motor current draw (sensed by measuring the voltage drop across the shunt resistor 514) and also as a function of the temperature of the FETs of the H bridge 500.

The FETs 502, 504, 506 and 508 are all mounted on a common heat sink. A temperature-sensing device 570 is attached to the heat sink to measure its temperature. The output of the temperature-sensing device 570 is connected to a nonlinear function generator network 572 which outputs a voltage which is a nonlinear function of the output voltage from the temperature-sensing device 570. The output of the nonlinear network 572 is connected to the negative input of a differential amplifier 574. The signal at the positive input is derived from the signal across the shunt resistor 514.

The junction of the shunt resistor 514 with the lower FETs 506, 508 is first connected to an amplifier 576 which amplifies the pulse signals that occur across the shunt resistor 514 during energization of the electric assist motor 36. The amplitude of the output pulses from amplifier 576 varies with the amount of current through the shunt resistor. For example, its output voltage may be approximately 50 millivolts per amp of current through the shunt resistor 514.

The output of the amplifier 576 is connected to one side of switch 582. The other side of switch 582 is connected to an RC filter network including a series resistor 578 and shunt capacitor 580. An amplifier 586 is connected between the junction of resistor 578 and capacitor 580. The voltage across the capacitor 580 is the integrated voltage across the resistor 514 which is indicative of the current flowing through the shunt resistor 514. The switch 582 is controlled by the pulse width modulated signal from the counter 430, after the signal is inverted by inverter 584. The switch 582 is open during the OFF time of the PWM signal and is closed during the ON time of the PWM signal. The combination of the switch 582, resistor 578 and capacitor 580 functions as a sample and hold circuit wherein the voltage across the shunt resistor is sampled during the ON time of the PWM signal when the switch 582 is closed.

The comparator 574 compares the voltage from the amplifier 586, which is generally indicative of the current being applied to the motor, with the voltage from the network 572, which is indicative of the temperature of the heat sink carrying the FETs 502, 504, 506 and 508. The comparator 574 insures that for a given temperature, as sensed by the temperature sensor 570, the current through the motor does not exceed a certain amount. The output of the network 572, in essence, provides a reference voltage that varies with temperature. As temperature of the heat sink increase, the maximum current permitted through the motor decreases.

The motor current-representative signal at the output of amplifier 586 is also applied to the plus input of another comparator 588. The negative input of comparator 588 is connected to a potentiometer 590 connected across the 5 volt DC supply and ground and is adjustable to provide a reference voltage for the comparator 588. The comparator 588 compares the voltage from amplifier 586, which is indicative of the current through the shunt resistor 514, with the reference voltage established by the potentiometer 590. The comparator 588 is used as a check that the current being applied to the motor does not exceed an absolute value set by the potentiometer 590.

NOR gate 592 is connected to the outputs of the comparator 574 and comparator 588. The output of NOR gate 592 is connected to the other input of AND gate 440. The output of NOR gate 592 is HIGH when both the absolute current through the motor and the current through the motor for the given temperature of the FETs are within limits. If the current through the motor exceeds the absolute limit set by potentiometer 590, or if the current through the motor exceeds a limit functionally related to the sensed temperature, the output of NOR gate 592 switches from HIGH to a LOW.

When the output of NOR gate 592 is HIGH, the PWM signal from counter 430 is passed by AND gate 440. If, however, the output of NOR gate 592 goes LOW during a PWM pulse, the output of AND gate 440 will switch LOW even though the PWM signal from counter 430 is still HIGH. The duty cycle fold back circuit 264, therefore, will cut off the trailing parts of PWM pulses outputted from counter 430, when necessary in response to the two current checks. The circuit therefore, in essence, reduces or "folds back" the duty cycle of the PWM signal when necessary to reduce motor current.

If the absolute current applied to the motor 36 exceeds the predetermined value set by potentiometer 590, the duty cycle is cut off by the output of the NOR gate 592 going LOW, forcing the output of AND gate 440 LOW. The same occurs if the current through the motor exceeds a variable limit established by the temperature sensor 570 and network 572 which also causes the output of NOR gate 592 to go LOW and effectively cut off the duty cycle of the PWM signal at the output of the AND gate 440.

Portions of the fault circuitry 270 have been discussed with reference to the sensor-to-sensor checking circuit 358 and the sensor-out-of-limit check 350. Another fault circuit 270, not yet discussed, is an excess PWM check circuit 600 (FIG. 11). Excess PWM check circuit 600 includes an OR gate 602 which combines the outputs of OR gate 444 and OR gate 446. The PWM signal outputted to drive the electric assist motor 36 will be present either at OR gate 444 or OR gate 446, and will thus always appear also at the output of OR gate 602. A comparator 604 has its negative output connected to the output of OR gate 602 through a PWM demodulating filter including a series resistor 606 and shunt capacitor 608. The negative input to the amplifier 604 thus receives a DC voltage proportional to the duty cycle of the PWM signal. The positive input of the comparator 604 is connected to a potentiometer 610 which is connected across the 5 volt supply to ground. If the duty cycle exceeds a predetermined value established by the setting of the potentiometer 610, the output of comparator 604 switch from a HIGH to a LOW.

When the duty cycle of the PWM signal is small, the reference voltage at the positive input of the comparator 604 will be greater than the demodulated PWM voltage at the negative input of the comparator 604. As the duty cycle of the PWM signal increases, the voltage at the negative input of comparator 604 will increase. Once the demodulated PWM voltage exceeds the reference voltage at the positive input of the comparator 604, the output of comparator 604 will switch from a digital HIGH to a digital LOW. When this occurs, the output of the torsion sensors should be indicating a high steering wheel input torque. (A high PWM duty cycle should not occur, otherwise.) The remainder of circuit 618 checks for a concordance of these conditions.

The output of comparator 604 is connected to one input of OR gate 612. The other two inputs of OR gate 612 are derived from a window comparator including comparators 614 and 616. The output of torsion sensor B is operatively connected to the positive input of the comparator 614 and the negative input of the comparator 616. A resistor network 618 is provided which includes resistors 620, 622 and 624 connected in series between the 5 volt supply and ground. The junction between resistors 620, 622 is connected to the negative input of the comparators 614. The junction between resistors 622, 624 is connected to the positive input of the comparator 616.

Assume that the resistors of the network 618 are selected so that the voltage at the junction between resistors 620, 622 is 4.5 volts DC and the voltage at the junction of resistors 622, 624 is 3.5 volts DC. When no input torque is applied to the driver steering wheel, the output of torsion sensor B will be 4 volts DC. With 4 volts DC applied to the comparators 614 and 616, each yields a LOW digital output. Since no input torque is applied to the driver steering wheel, the output of the comparator 604 will be a digital HIGH, making the output of the OR gate 612 a digital HIGH. As input torque is applied to the vehicle steering wheel, the output of torsion sensor B will either increase or decrease from the initial 4 volt DC level.

Assume that a severe steering maneuver is being accomplished and high torque is applied to the steering wheel. The output of torsion sensor B then increases in voltage. Once the output signal from the torsion sensor B exceeds 4.5 volts DC, the output of the differential comparator 614 will switch from a digital LOW to a digital HIGH. If, prior to the input signal to the plus input of the comparator 614 reaching 4.5 volts, a PWM signal is generated that causes the comparator 604 to switch from a digital HIGH to a digital LOW, the output of the OR gate 612 will switch from a digital HIGH to a digital LOW. This represents an abnormal situation, since the high duty cycle is inconsistent with the torsion sensor output signal. A digital LOW at the output of OR gate 612 thus indicates a failure, while a maintained digital HIGH at the output of the OR gate 612 indicates a no-fault condition. In a similar manner, if input torque is applied to the steering wheel in a direction to lower the voltage from the output of the torsion sensor B, the comparator 616 is expected to switch from a digital LOW to a digital HIGH prior to the comparator 604 switching from a digital HIGH to a digital LOW. If not, the output of 0R gate 612 will drop LOW, indicating that an abnormal condition has been detected.

The excess PWM check circuit 600 also generally compares the outputs of torsion sensors A and B, since one input (the PWM signal) is a function of the output of torsion sensor A, and the other input (the input to the window comparator) is the actual output of torsion sensor B.

Another fault detection circuit 270 is the direction check circuit 630. The direction check circuit 630 compares the state of the direction control flip-flop 450 to the state of the "direction" bit of the digitized torsion sensor B output signal. If the states of the two signals are consistent, the circuit 630 outputs a digital HIGH. A digital LOW on the output of circuit 630 indicates that the two signals do not agree, and thus that a fault exists.

Circuit 630 includes two NOR gates 632 and 634, each of which receives a signal from the direction control flip-flop 450 (FIG. 12). More specifically, NOR gate 632 is connected to the output of NAND gate 452 of flip-flop 450 through inverter 455 (line H), and NOR gate 634 is connected to the output of NAND gate 454 through inverter 461 (line I). Recall that flip-flop 450 is designed to indicate the direction of a steering maneuver, as determined by torsion sensor A. The other input of NOR gate 632 is connected to the most significant bit from the output of the B latch 342, while the other input of the NOR gate 634 is connected to the most significant bit from the output of the B latch 342 through an inverter 636. The outputs of NOR gates 632, 634 are connected to the inputs of a NOR gate 638, the output of which is inverted by an inverter 640. The output of inverter 640 represents the output of check circuitry 630.

The most significant bit (i.e., the "direction" bit) of the digitized torsion sensor B output signal, as generated by the A-D converter 326, is latched in the B latch 342. Recall that the most significant bit for the converted torsion sensor A signal is latched in a flip-flop 348, with the output of flip-flip 348 being inverted from the MSB of the sensor A signal.

Assume that the most significant bit of the torsion sensor A signal is a digital HIGH, indicating a steering maneuver in one direction. The output of flip-flop 348 is then LOW. The digital LOW signal is inputted to the NAND gate 452 and the inverter 456, thus setting the RS flip-flop network 450 to a state where the output of NAND gate 452 is a digital HIGH and the output of the NAND gate 454 is a digital LOW. After the outputs of NAND gates 452, 454 pass through inverters 455, 461, respectively, a digital LOW is inputted to the NOR gate 632 and a digital HIGH is inputted to the NOR gate 634. The most significant bit out of the B latch should be the same as the most significant bit out of the flip-flop 348 (i.e., a digital LOW) since the flip-flop 348 inverts the most significant bit inputted from the output of the A-D converter 326, and since the A and B sensors respond in opposite directions to applied torque. The most significant bit of the B sensor will therefore input a LOW to the NOR gate 632 and a digital HIGH into the NOR gate 634, after the signal is inverted by inverter 636. The output of NOR gate 634 will then be a digital LOW, and the output of NOR gate 632 will be a digital HIGH. The output of NOR gate 638 will then be a digital LOW. The resulting digital HIGH on the output of the inverter 640 indicates that the torsion sensor A and the torsion sensor B detect a steering maneuver in the same direction. If torsion sensors A and B had instead indicated different directions, the output of the inverter 640 would have been a digital LOW.

The fault direction check should be disabled when no input torque is applied to the steering wheel since it is normal, and acceptable, for the "direction" bits of the digitized torsion sensor signals to disagree at that time. This is a false fault, since no torque is then being applied. The disablement of the direction check is accomplished by gating the output of circuitry 630 through an OR gate 641. One input of OR gate 641 is connected to the output of circuitry 630, while the other is connected to the output of a null detector 642. The input of the null detector 642 is connected to the output of PROM 364. The null detector outputs a digital HIGH when zero assist is requested from the look up table from PROM 364 and outputs a digital LOW when assist is requested. When no assist is requested, the HIGH outputted from the null detector 642 forces the output of OR gate 641 HIGH thereby, in essence, blocking a false fault from the direction check circuit 630.

Another fault detection circuit 270 includes a voltage level check circuit 650 which monitors the output voltage from the voltage regulators 268 as well as the battery voltage. If the voltage checks are within tolerance, a digital HIGH appears on the output of the voltage check circuitry 650.

All of the fault circuitry 270, including the sensor-out-of-limit check 350, the sensor-to-sensor check 358, the direction check 630, the excess PWM signal 600 and the voltage check circuitry 650 are connected to two relay control fault circuits 660, 662. The fault circuits 660, 662 are identical in content, connection, and operation and thus only one will be described in detail.

The output from each fault circuit is applied to a corresponding input of an AND gate 670, the output of which is inputted to the NAND gate 408 of flip-flop 404. If each of the fault detection circuits detects a "go" or "pass" condition, digital HIGHs are present at all of the inputs of the AND gate 670, thereby causing a digital HIGH to be outputted to the NAND gate 408. As long as the output of AND gate 670 is HIGH, flip-flop 404 remains in the state in which it was set upon power-up. In the initial state, the output of NAND gate 408 is LOW and the output of NAND gate 410 is HIGH. When the flip-flop 404 is in its initial state, the output of AND gate 406 is HIGH. If a fault occurs, the output of AND gate 670 goes LOW, thus forcing flip-flop 404 to toggle, and the output of AND gate 406 to drop LOW.

The outputs of the fault circuitry 660, 662 are respectively connected to solid state switches 680, 682. The switches are in their low impedance, or "closed", states when a digital HIGH is outputted from the AND gates 406. When no fault is present, both switches 680, 682 are closed, thereby energizing an excitation coil 688, closing the main power relay 272, and providing power to the drive circuit 260. If a fault should occur, one of the inputs to the AND gate 670 will go LOW (depending on the fault detected by the circuitry) causing the flip-flop 404 to toggle and the output of the NAND 410 to drop to a digital LOW. The output of AND gate 406 then switches to a digital LOW, thus open solid state switches 680, 682. The fault detection circuitry 660, 662 in combination with the solid state switches 680, 682 provide redundancy so that if one of the fault circuits should fail, the other fault circuit will still be available to open its associated solid state switch in the event of a fault, thereby disabling power to the drive circuit 260.

As a further safety feature of the circuitry, the output of the null detection circuit 642 is connected to one input of a NOR gate 700. The output of the fault circuits 660 and 662 are each connected to other inputs of NOR gate 700 through inverters 702 and 704, respectively. The output of NOR gate 700 is connected to inputs of both NAND gates 452 and 454 of the RS flip-flop 450. The output of NOR gate 700 is capable of disabling both outputs of the direction control flip-flop 450. When no faults exist and the null detect circuit 642 detects that assist is requested, the output of NOR gate 700 is HIGH. The flip-flop 450 is thereby enabled to be set and reset in response to the output of the flip-flop 348. If the null detect circuit detects a null (i.e., no applied input torque) or either fault circuit detects a fault condition, the output of NOR gate 700 will be LOW. The LOW on the output of NOR gate 700 disables the flip-flop 450 by outputting HIGHs from both NAND gates 452, 454. This turns off both of the upper FETs 502 and 504 in the H-bridge 500, thus removing all power from the motor 36.

The embodiment of the invention described herein utilized a 2.3 MHz system clock frequency and a 256 divide down to yield a 9 kHz frequency for the PWM signal. It has been found that utilization of a 4.0 MHz system clock frequency with a 256 divide down to yield a 15.6 kHz frequency for the PWM signal reduces audible mechanical noise within the vehicle without causing electrical interference with the vehicle radio.

This invention has been described with reference to a preferred embodiment. Modifications and alterations may occur to others upon reading and understanding this specification. It is our intention to include all such modifications and alterations insofar as they come within the scope of the appended claims.

Having described preferred embodiments of the invention, the following is claimed:

1. A steering assembly for turning the steerable wheels of a vehicle upon rotation of the vehicle steering wheel, said assembly comprising:
   means for mechanically coupling the vehicle steering wheel with the steerable wheels of a vehicle;
   torsion sensing means for providing an electric signal having a value which varies as a function of the amount of input torque applied to said steering wheel;
   speed sensing means for sensing the speed of the vehicle and for providing an electric signal indicative thereof;
   electronic control means connected to said torsion sensing means and to said speed sensing means, said electronic control means including speed decoder means for providing a plurality of coded electric signals, each coded signal being indicative of the vehicle being within a particular range of vehicle speeds, memory means for storing a plurality of look-up tables, each vehicle speed range having an associated look-up table, each look-up table having a control value corresponding to a value of the signal provided by said torsion sensing means, means for selecting a look-up table responsive to said coded electric signal indicative of the vehicle being within a particular range of vehicle speeds, means for selecting a control value from a selected look-up table responsive to the value of the signal provided by said torsion sensing means, and means for generating an electric control signal responsive to said selected control value form said selected look-up table;
   signal generating means for sequentially generating control values from a minimum assist value to a maximum assist value in a predetermined amount of time, said electric control signal being responsive to the smaller of (i) the selected control value from said selected look-up table, or (ii) the control value generated by said signal generating means; and
   power assist means for providing steering assist to aid a vehicle operator in a steering maneuver, the amount of assist being responsive to the electric control signal.

2. The steering assembly of claim 1 wherein said memory means is a programmable read only memory, and said signal generating means for sequentially generating control values is a binary soft start counter initially loaded with a zero value, said electronic control means further including a comparator for comparing the control value outputted from the programmable read only memory with the count outputted from the soft start counter and a value switch controlled by said comparator for passing the smaller value outputted from the programmable read only memory or the soft start counter.

3. The steering assembly of claim 2 wherein said means for generating an electric control signal includes a down counter having its preload inputs connected to said value switch, the value passed by said value switch being loaded into said down counter periodically at a fixed frequency, a clock for clocking said down counter, the output of said down counter being at an initial digital state when the value from the value switch is loaded therein and switching to another digital state when said down counter counts down to zero, the output of said down counter being a pulse width modulated signal with the duty cycle determined by said value outputted by said value switch and loaded into said down counter, said power assist means being responsive to the duty cycle of said pulse width modulated signal.

4. A steering assembly for turning the steerable wheels of a vehicle upon rotation of the vehicle steering wheel, said assembly comprising:
   means for mechanically coupling the vehicle steering wheel with the steerable wheels of the vehicle including,
   an input shaft connected to said steering wheel of rotation therewith,
   a pinion gear,
   a torsion member resiliently connecting said input shaft to said pinion gear, and
   a steering member having rack teeth thereon drivingly engaged by said pinion gear and connected to said steerable wheels of said vehicle, rotary motion of said pinion gear axially driving said steering member to turn said steerable wheels;
   torsion sensing means for providing an electric signal having a value which varies as a function of the amount of input torque applied to said steering wheel;
   speed sensing means for sensing the speed of the vehicle and for providing an electric signal indicative thereof;
   electronic control means connected to said torsion sensing means including speed decoder means for providing a plurality of coded electric signals, each coded signal being indicative of the vehicle being within a particular range of vehicle speeds, memory means for storing a plurality of look-up tables, each vehicle speed range having an associated look-up table, each look-up table having a control value corresponding to a value of the signal provided by said torsion sensing means, means for selecting a look-up table responsive to said coded electric signal indicative of the vehicle being within a particular range of vehicle speeds, means for selecting a control value from a selected look-up table responsive to the value of the signal provided by said torsion sensing means, and means for generating a pulse width modulated signal having a duty cycle controlled by said control value from said selected look-up table;

an electric power assist motor drivably connected to at least one of said input shaft, said pinion gear or said steering member for assisting movement thereof, the amount of assist being a function of electrical current flow through the motor; and signal generating means for sequentially generating control values from a minimum assist value to a maximum assist value within a predetermined amount of time, said means for generating a pulse width modulated signal having a duty cycle responsive to the smaller of (i) the control value from said selected look-up table, or (ii) the control value generated by said signal generating means.

5. The steering assembly of claim 4 wherein said memory means is a programmable read only memory, and said signal generating means for sequentially generating control values is a binary soft start counter initially loaded with a zero value, said electronic control means further including a comparator for comparing the control value outputted from the programmable read only memory with the count outputted from the soft start counter and a value switch controlled by said comparator for passing the smaller value outputted from the programmable read only memory or the soft start counter.

6. The steering assembly of claim 5 wherein said means for generating a pulse width modulated signal includes a down counter having its preload inputs connected to said value switch, the value passed by said value switch being loaded into said down counter periodically at a fixed frequency, a clock for clocking said down counter, the output of said down counter being at an initial digital state when the value from the value switch is loaded therein and switching to another digital state when said down counter counts down to zero, the output of said down counter being the pulse width modulated signal with the duty cycle determined by said value outputted by said value switch and loaded into said down counter.

7. The steering assembly of claim 6 further including solid state electrical switches for switchably connecting an electrical drive potential to said electric power assist motor, said electrical switches being controlled by said pulse width modulated signal, the amount of current supplied to said electric power assist motor being a function of the duty cycle of the pulse width modulated signal, said electronic control means further including temperature sensing means for sensing case temperature of said solid state electrical switches, means for folding back the duty cycle of said pulse width modulated signal outputted from said down counter responsive to the temperature sensed by said temperature sensing means such that the current supplied to said electric assist motor decreases as the sensed case temperature increases.

8. The steering assembly of claim 6 further including solid state electrical switches for switchably connecting an electrical drive potential to said electric power assist motor, said electrical switches being controlled by said pulse width modulated signal, the amount of current supplied to said electric power assist motor being a function of the duty cycle of said pulse width modulated signal, said electronic control means further including current sensing means for sensing the actual current through said electric power assist motor, means responsive to said current sensing means for limiting the duty cycle of said pulse width modulated signal outputted from said down counter to a predetermined maximum limit.

9. A method of controlling a vehicle power assist steering assembly having a vehicle steering wheel mechanically coupled to steerable wheels of the vehicle, power assist means for assisting a vehicle operator in a steering maneuver with an amount of assist available being responsive to an electrical control signal, a torque sensor for providing an electrical signal having a value indicative of applied steering torque, and a speed sensor for providing an electrical signal indicative of vehicle speed, said method comprising the steps of:

(a) storing a plurality of addressable look-up tables, each table being associated with a particular vehicle speed range and each table having a control value corresponding to a value of the torque sensor signal;

(b) determining which one of the plurality of speed ranges the vehicle is at from the speed sensor signal;

(c) addressing an appropriate look-up table in response to the determined vehicle speed range;

(d) selecting a control value from the addressed look-up table in response to the value of the torque sensor signal;

(e) sequentially generating control values from a minimum assist value to a maximum assist value within a predetermined amount of time; and (f) generating said electrical control signal in response to the smaller of (i) the control value selected from said selected look-up table, or (ii) the control value being sequentially generated.

10. A steering assembly for turning the steering wheels of a vehicle upon rotation of the vehicle steering wheel, said assembly comprising:

means for mechanically coupling the vehicle steering wheel with the steerable wheels of the vehicle;

torsion sensing means for providing an electric signal having a value which varies as a function of the amount of input torque applied to said steering wheel;

speed sensing means for sensing the speed of the vehicle and for providing an electric signal indicative thereof;

electronic control means connected to said torsion sensing means and to said speed sensing means, said electronic control means including speed decoder means for providing a plurality of coded electric signals, each coded signal being indicative of the vehicle being within a particular range of vehicle speeds, memory means for storing a plurality of look-up tables, each vehicle speed range having an associated look-up table, each look-up table having a control value corresponding to a value of the signal provided by said torsion sensing means, means for selecting a look-up table responsive to said coded electric signal indicative of the vehicle being within a particular range of vehicle speeds, means for selecting a control value from a selected look-up table responsive to the value of the signal provided by said torsion sensing means, and means for generating a pulse width modulated signal having a duty cycle controlled by said selected control value from said selected look-up table;

an electric assist motor for providing steering assist to aid a vehicle operator in a steering maneuver, the amount of assist being responsive to the electric control signal; and solid state electrical switches for switchably connecting an electrical drive potential to said electric power assist motor, said electrical switches being controlled by said pulse width modulated signal, the amount of current supplied to said electric power assist motor being proportional to the duty cycle of the pulse width modulated signal, said electronic control means further including temperature sensing means for sensing case temperature of said solid state electrical switches, means for folding back the duty cycle of said pulse width modulated signal responsive to the temperature sensed by said temperature sensing means such that the current supplied to said electric assist motor decreases as the sensed case temperature increases.

11. A steering assembly for turning the steerable wheels of a vehicle upon rotation of the vehicle steering wheel, said assembly comprising:

means for mechanically coupling the vehicle steering wheel with the steerable wheels of the vehicle;

torsion sensing means for providing an electric signal having a value which varies as a function of the amount of input torque applied to said steering wheel;

speed sensing means for sensing the speed of the vehicle and for providing an electric signal indicative thereof;

electronic control means connected to said torsion sensing means and to said speed sensing means, said electronic control means including speed decoder means for providing a plurality of coded electric signals, each coded signal being indicative of the vehicle being within a particular range of vehicle speeds, memory means for storing a plurality of look-up tables, each vehicle speed range having an associated look-up table, each look-up table having a control value corresponding to a value of the signal provided by said torsion sensing means, means for selecting a look-up table responsive to said coded electric signal indicative of the vehicle being within a particular range of vehicle speeds, means for selecting a control value from a selected look-up table responsive to the value of the signal provided by said torsion sensing means, and means for generating pulse width modulated signal having signal having a duty cycle controlled by said selected control value from said selected look-up table;

an electric assist motor for providing steering assist to aid a vehicle operator in a steering maneuver, the amount of assist being responsive to the electric control signal; and solid state electrical switches for switchably connecting an electrical drive potential to said electric power assist motor, said electrical switches being controlled by said pulse width modulated signal, the amount of current supplied to said electric power assist motor being proportional to the duty cycle of said pulse width modulated signal, said electronic control means further including current sensing means for sensing the actual current through said electric power assist motor, means responsive to said current sensing means for limiting the duty cycle of said pulse width modulated signal to a predetermined maximum limit.

12. A steering assembly for turning the steerable wheels of a vehicle upon rotation of the vehicle steering wheel, said assembly comprising:

means for mechanically coupled the vehicle steering wheel with the steerable wheels of the vehicle including, an input shaft connected to said steering wheel for rotation therewith, a pinion gear, a torsion member resiliently connecting said input shaft to said pinion gear, and a steering member having rack teeth thereon drivingly engaged by said pinion gear and connected to said steerable wheels of said vehicle, rotary motion of said pinion gear axially driving said steering member to turn said steerable wheels;

torsion sensing means for providing an electric signal having a value which varies as a function of the amount of input torque applied to said steering wheel;

speed sensing means for sensing the speed of the vehicle and for providing an electric signal indicative thereof;

electronic control mean connected to said torsion sensing means including speed decoder means for providing a plurality of coded electric signals, each coded signal being indicative of the vehicle being within a particular range of vehicle speeds, memory means for storing a plurality of look-up tables, each vehicle speed range having an associated look-up table, each look-up table having a control value corresponding to a value of the signal provided by said torsion sensing means, means for selecting a look-up table responsive to said coded electric signal indicative of the vehicle being within a particular range of vehicle speeds, means for selecting a control value from a selected look-up table responsive to the value of the signal provided by said torsion sensing means, and means for generating a pulse width modulated signal having a duty cycle controlled by said control value from said selected look-up table;

an electric power assist motor drivably connected to at least one of said input shaft, said pinion gear or said steering member for assisting movement thereof, the amount of assist being a function of the duty cycle of the drive signal; and solid state electrical switches for switchably connecting an electrical drive potential to said electric power assist motor, said electrical drive potential to said electric power assist motor, said electrical switches being controlled by said pulse width modulated signal, the amount of current supplied to said electric power assist motor being proportional to the duty cycle of the pulse width modulated signal, said electronic control means further including temperature sensing means for sensing case temperature of said electrical switches, means for folding back the duty cycle of said pulse width modulated signal responsive to the temperature sensed by said temperature sensing means such that current supplied to said electric power assist motor decreases as the sensed case temperature increases.

* * * * *

UNITED STATES PATENT AND TRADEMARK OFFICE
CERTIFICATE OF CORRECTION

PATENT NO. : 4,800,974

DATED : January 31, 1989

INVENTOR(S) : Thomas J. Wand; Philip A. Gaubis; Philip Q. Guest, Jr

It is certified that error appears in the above-identified patent and that said Letters Patent is hereby corrected as shown below:

Column 25, line 53, change "form" to "from"

Signed and Sealed this

Eighth Day of August, 1989

Attest:

DONALD J. QUIGG

Attesting Officer

Commissioner of Patents and Trademarks